(12) United States Patent
Agrawal et al.

(10) Patent No.: US 11,861,860 B2
(45) Date of Patent: Jan. 2, 2024

(54) BODY DIMENSIONS FROM TWO-DIMENSIONAL BODY IMAGES

(71) Applicant: Amazon Technologies, Inc., Seattle, WA (US)

(72) Inventors: Amit Kumar Agrawal, Santa Clara, CA (US); Siddharth Choudhary, San Jose, CA (US); Antonio Criminisi, Cambridge (GB); Ganesh Subramanian Iyer, Sunnyvale, CA (US); JinJin Li, San Jose, CA (US); Prakash Ramu, Portland, OR (US); Brandon Michael Smith, Fremont, CA (US); Durga Venkata Kiran Yakkala, Eluru (IN)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 17/489,393

(22) Filed: Sep. 29, 2021

(65) Prior Publication Data
US 2023/0096013 A1    Mar. 30, 2023

(51) Int. Cl.
G06T 7/60  (2017.01)
G06T 7/11  (2017.01)
G06T 7/70  (2017.01)
G06V 40/10  (2022.01)
(Continued)

(52) U.S. Cl.
CPC ............... *G06T 7/60* (2013.01); *G01B 11/24* (2013.01); *G06T 7/11* (2017.01); *G06T 7/70* (2017.01); *G06T 17/20* (2013.01); *G06V 40/103* (2022.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| 6,188,925 | B1 | 2/2001 | Kawanishi et al. |
| 6,468,209 | B1 | 10/2002 | Heymsfield et al. |
| 8,918,162 | B2 | 12/2014 | Prokoski |

(Continued)

FOREIGN PATENT DOCUMENTS

| CA | 2884668 A1 | 9/2016 |
| CN | 106295205 A | 1/2017 |

(Continued)

OTHER PUBLICATIONS

Ji et al.; "Human body shape reconstruction from binary silhouette images;" Computer Aided Geometric Design 71(2019) pp. 231-243; Elsevier B.V. (Year: 2019).*

(Continued)

*Primary Examiner* — Edward Martello
(74) *Attorney, Agent, or Firm* — Athorus, PLLC

(57) ABSTRACT

Described are systems and methods to determine one or more body dimensions of a body based on a processing of one or more two-dimensional images that include a representation of the body. Body dimensions include any length, circumference, etc., of any part of a body, such as shoulder circumference, chest circumference, waist circumference, hip circumference, inseam length, bicep circumference, leg circumference, etc.

22 Claims, 22 Drawing Sheets

(51) Int. Cl.
G01B 11/24 (2006.01)
G06T 17/20 (2006.01)

(56) References Cited

U.S. PATENT DOCUMENTS

| | | |
|---|---|---|
| 8,982,147 B2 | 3/2015 | Ramani et al. |
| 9,801,550 B2 | 10/2017 | Ferrantelli |
| 9,839,376 B1 | 12/2017 | Ross et al. |
| 10,321,728 B1 | 6/2019 | Koh et al. |
| 10,489,683 B1 | 11/2019 | Koh et al. |
| 10,559,111 B2 | 2/2020 | Sachs et al. |
| 10,636,158 B1 | 4/2020 | Kamiyama et al. |
| 10,657,709 B2 | 5/2020 | Moore et al. |
| 10,748,217 B1 | 8/2020 | Ross et al. |
| 10,796,480 B2 | 10/2020 | Chen et al. |
| 10,926,404 B2 | 2/2021 | Jackson et al. |
| 10,945,813 B2 | 3/2021 | Li et al. |
| 2004/0151366 A1 | 8/2004 | Nefian et al. |
| 2005/0251347 A1 | 11/2005 | Perona et al. |
| 2006/0061583 A1 | 3/2006 | Spooner et al. |
| 2006/0222206 A1 | 10/2006 | Garoutte |
| 2013/0325493 A1 | 12/2013 | Wong et al. |
| 2014/0121564 A1 | 5/2014 | Raskin |
| 2014/0340479 A1 | 11/2014 | Moore et al. |
| 2015/0154453 A1* | 6/2015 | Wilf ................. G06T 7/62 382/103 |
| 2016/0247017 A1 | 8/2016 | Sareen et al. |
| 2016/0284123 A1 | 9/2016 | Hare et al. |
| 2017/0273639 A1 | 9/2017 | Iscoe et al. |
| 2018/0089821 A1 | 3/2018 | Koldyshev |
| 2018/0289334 A1 | 10/2018 | Brouwer et al. |
| 2019/0122424 A1 | 4/2019 | Moore et al. |
| 2019/0191137 A1 | 6/2019 | Bisti |
| 2019/0347817 A1 | 11/2019 | Ferrantelli et al. |
| 2020/0193710 A1 | 6/2020 | Talgorn et al. |
| 2020/0319015 A1 | 10/2020 | Kamiyama et al. |
| 2021/0097759 A1 | 4/2021 | Agrawal et al. |
| 2021/0232924 A1 | 7/2021 | Sun et al. |
| 2022/0147735 A1 | 5/2022 | Suh et al. |
| 2022/0292351 A1 | 9/2022 | Etemad et al. |
| 2023/0065288 A1 | 3/2023 | Valsan et al. |

FOREIGN PATENT DOCUMENTS

| | | |
|---|---|---|
| CN | 108652584 A | 10/2018 |
| CN | 110051353 A | 7/2019 |
| WO | 2022204343 A1 | 9/2022 |

OTHER PUBLICATIONS

Zhao, Ruiqi, Yan Wang, and Aleix M. Martinez. "A Simple, Fast and Highly-Accurate Algorithm to Recover 3D Shape rom 2D Landmarks on a Single Image." IEEE Transactions on Pattern Analysis and Machine Intelligence, vol. 40, No. 12 (2017): 3059-3066. (Year: 2018).

Biggs, Benjamin, et al. "3D Multi-bodies: Fitting Sets of Plausible 3D Human Models to Ambiguous Image Data." Advances in Neural Information Processing Systems 34 (2020): 20496-20507. (Year: 2020).

Seo, Hyewon, Young In Yeo, and Kwangyun Wahn. "3D Body Reconstruction from Photos Based on Range Scan." International Conference on Technologies for E-Learning and Digital Entertainment. Springer-Verlag, Berlin, Heidelberg, 2006. pp. 849-860 (Year: 2006).

Zhang, Tianshu, Buzhen Huang, and Yangang Wang. "Object-Occluded Human Shape and Pose Estimation from a Single Color Image." Proceedings of the I EEE/CVF Conference on Computer Vision and Pattern Recognition. 2020. (Year: 2020) 10 pages.

Kolotouros, N. et al. "Learning to Reconstruct 3D Human Pose and Shape via Model-fitting in the Loop," In Proceedings of the IEEE International Conference on Computer Vision, 2019, Sep. 27, 2019, URL: https://arxiv.org/abs/1909.12828, 10 pages.

Sengupta, A. et al. "Hierarchical Kinematic Probability Distributions for 3D Human Shape and Pose Estimation from Images in the Wild," In International Conference on Computer Vision, Oct. 2021, URL: https://www.researchgate.net/publication/355060401_Hierarchical_Kinematic_Probability_Distributions_for_3D_Human_Shape_and_Pose_Estimation_from_Images_in_the_Wild, 17 pages.

Sengupta, A. et al. "Synthetic Training for Accurate 3D Human Pose and Shape Estimation in the Wild," In British Machine Vision Conference (BMVC), Sep. 2020, URL: https://www.researchgate.net/publication/344335326_Synthetic_Training_for_Accurate_3D_Human_Pose_and_Shape_Estimation_in_the_Wild, 13 pages.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Tome, D., Russell, C. and Agapito, L. Lifting from the Deep: Convolutional 3D Pose Estimation from a Single Image. In Proceedings of the IEEE Conference on Computer Vision and Pattern Recognition 2017 (pp. 2500-2509), 11 pages.

Varol, G., Ceylan, D., Russell, B., Yang, J., Yumer, E., Laptev, I. and Schmid, C., "BodyNet: Volumetric Inference of 3D Human Body Shapes," In European Conference on Computer Vision (ECCV), 2018, 17 pages.

Varol, G., Romero, J., Martin, X., Mahmood, N., Black, M. J., Laptev, I. and Schmid, C., "Learning from Synthetic Humans," In IEEE Conference on Computer Vision and Pattern Recognition (CVPR), 2017, 9 pages.

Wiles, Olivia and Andrew Zisserman, "SilNet: Single- and Multi-View Reconstruction by Learning from Silhouettes," Visual Geometry Group, Department of Engineering Science, University of Oxford, Oxford, UK, arXiv preprint arXiv: 1711.07888. Nov. 21, 2017, Cornell University, URL: https://arxiv.org/pdf/1711.07888.pdf, 13 pages.

Xi, P., Lee, W.-S. and Shu, C., "A Data-Driven Approach to Human-Body Cloning Using a Segmented Body Database," In Pacific Conference on Computer Graphics and Applications (PG), 2007, 9 pages.

Xie, H., Yao, H., Sun, X., Zhou, S. and Zhang, S. Pix2Vox: Context-aware 3D Reconstruction from Single and Multi-view Images. arXiv preprint arXiv: 1901.11153, https://arxiv.org/pdf/1901.11153.pdf, Jul. 29, 2019, 9 pages.

Yu, F., Zhang, Y., Song, S., Seff, A., and Xiao, J., "LSUN: Construction of a Large-Scale Image Dataset Using Deep Learning with Humans in the Loop," arXiv preprint arXiv:1506.03365, 2015, 9 pages.

Zanfir, A., Marinoiu, E. and Sminchisescu, C., "Monocular 3D Pose and Shape Estimation of Multiple People In Natural Scenes—the Importance of Multiple Scene Constraints," In IEEE Conference on Computer Vision and Pattern Recognition (CVPR), 2018, 10 pages.

Zhang, H., Dana, K., Shi, J., Zhang, Z., Wang, X., Tyagi, A. and Agrawal, A., "Context Encoding for Semantic Segmentation," In The IEEE Conference on Computer Vision and Pattern Recognition (CVPR), Jun. 2018, 10 pages.

Zhu, R., H. Kiani Galoogahi, C. Wang and S. Lucey, "Rethinking Reprojection: Closing the Loop for Pose-aware Shape Reconstruction from a Single Image," The Robotics Institute, Carnegie Mellon University, In Proceedings of the IEEE International Conference on Computer Vision, Jul. 26, 2017 (pp. 57-65), 9 pages.

Hassan B, Izquierdo E and Piatrik T. Soft Biometrics: A Survey Benchmark Analysis, Open Challenges and Recommendations. Multimedia Tools and Applications. Mar. 2, 2021, 44 pages.

(56) References Cited

OTHER PUBLICATIONS

Nambiar A, Bernardino A and Nascimento J. Shape Context for Soft Biometrics in Person Re-Identification and Database Retrieval. Pattern Recognition Letters. Dec. 15, 2015; 68:297-305.

Ramanathan V and Wechsler H. Robust Human Authentication Using Appearance and Holistic Anthropometric Features. Pattern Recognition Letters. Nov. 1, 2010; 31(15):2425-35.

Varol G, Ceylan D, Russell B, Yang J, Yumer E, Laptev I and Schmid C. Bodynet: Volumetric Inference of 3D Human Body Shapes (and Supplemental Material). In Proceedings of the European Conference on Computer Vision (ECCV) 2018 (pp. 20-36).

Anguelov, D., Srinivasan, P., Koller, D., Thrun, S., Rodgers, J. and Davis, J., "SCAPE: Shape Completion and Animation of People," ACM Trans. Graph. (Proc. SIGGRAPH), 24(3):408-416, Jul. 2005, 9 pages, http://robots.stanford.edu/papers/anguelov.shapecomp.pdf.

Anonymous: "BMI 3D", www.bmi3d.de; Nov. 25, 2018 (Nov. 25, 2018), XP002801424,URL: https://web.archive.org/web/20181125231845/https://www.bmi3d.de/rechner.html [Retrieved from the Internet on Dec. 16, 2020]; the whole document.

Anonymous: "Documentation: What is MakeHuman?", MakeHuman, May 20, 2016 (May 20, 2016), XP002801426, URL: http://www.makehumancommunity.org/wiki/Documentation:What is MakeHuman%3F [Retrieved from the Internet on Jan. 30, 2021]; the whole document.

Anonymous: "Virtual Weight Loss Simulator", www.changeinseconds. com; Dec. 11, 2016 (Dec. 11, 2016), XP002801425, URL: https://web.archive.org/web/20161206202928;%20/http://www.changeinseconds.com/simulator/ [Retrieved from the Internet on Dec. 16, 2020]; the whole document.

Balan, A. O. and Black, M. J., "The Naked Truth: Estimating Body Shape under Clothing," In European Conference on Computer Vision (ECCV), 2008, 15 pages, https://www.researchgate.net/profile/Michael_Black6/publication/221305001_The_Naked_Truth_Estimating_Body_Shape_Under_Clothing/links/0fcfd512d21f538458000000/The-Naked-Truth-Estimating-Body-Shape-Under-Clothing.pdf? origin=publication_detail.

Bălan, A. O., Sigal, L., Black, M. J., Davis, J. E. and Haussecker, H. W., "Detailed Human Shape and Pose from Images," In IEEE Conference on Computer Vision and Pattern Recognition (CVPR), 2007, 9 pages.

Bogo, F., Kanazawa, A., Lassner, C., Gehler, P., Romero, J. and Black, M. J., "Keep it SMPL: Automatic Estimation of 3D Human Pose and Shape from a Single Image," In European Conference on Computer Vision (ECCV). 2016, 21 pages, https://arxiv.org/pdf/1607.08128v1.pdf.

Boisvert, J., Shu, C., Wuhrer, S., and Xi, P., "Three-Dimensional Human Shape Inference from Silhouettes: Reconstruction and Validation," Machine Vision and Applications, 24(1):145-157, 2013, 13 pages, http://people.scs.carleton.ca/~c_shu/Publications/silhouettes_human_rec_MVA11.pdf.

Bukar et al., "Automatic age and gender classification using supervised appearance model," Journal of Electronic Imaging, Aug. 2016; 25(6):0601605, 12 pages.

Chen, W., Wang, H., Li, Y., Su, H., Wang, Z., Tu, C., Lischinski, D., Cohen-Or, D. and Chen, B. Synthesizing Training Images for Boosting Human 3D Pose Estimation. In 2016 Fourth International Conference on 3D Vision (3DV) Oct. 25, 2016 (pp. 479-488). IEEE, 10 pages.

Chen, X., Guo, Y., Zhou, B. and Zhao, Q., "Deformable Model for Estimating Clothing and Naked Human Shapes from a Single Image," The Visual Computer, 29(11):1187-1196, 2013, 10 pages.

Chen, Y., Kim, T.-K. and Cipolla, R., "Inferring 3D Shapes and Deformations from Single Views," In European Conference on Computer Vision, 2010, 14 pages.

Chen, Y., Kim, T.-K. and Cipolla, R., Silhouette-Based Object Phenotype Recognition Using 3D Shape Priors. In Inter-national Conference on Computer Vision (ICCV), 2011, 8 pages.

Devries, T. and Taylor, G. W., Learning Confidence for Out-of-Distribution Detection in Neural Networks, arXiv preprint arXiv:1802.04865, 2018, 12 pages.

Dibra, E., Jain, H., Öztireli, C., Ziegler, R. and Gross, M., "HSNets: Estimating Human Body Shape from Silhouettes with Convolutional Neural Networks," In International Conference on 3D Vision (3DV), 2016, 10 pages.

Dibra, E., Jain, H., Öztireli, C., Ziegler, R. and Gross, M., "Human Shape from Silhouettes Using Generative HKS Descriptors and Cross-Modal Neural Networks," In IEEE Conference on Computer Vision and Pattern Recognition (CVPR), 2017, 11 pages.

Dibra, E., Jain, H., Öztireli, C., Ziegler, R. and Gross, M., "Shape from Selfies: Human Body Shape stimation Using CCA Regression Forests," In European Converence on Computer Vision (ECCV), 2016, 17 pages.

Gilbert, A., Volino, M., Collomosse, J. and Hilton, A.,"Volumetric Performance Capture from Minimal Camera View-Points," In European Conference on Computer Vision, 2018, 16 pages.

Gong, K., Liang, X., Zhang, D., Shen, X. and Lin, L., "Look into Person: Self-Supervised Structure-Sensitive Learning and a New Benchmark for Human Parsing," In IEEE Conference on Computer Vision and Pattern Recognition (CVPR), 2017, 9 pages.

Guan, P., Weiss, A., Balan, A. O. and Black, M. J., "Estimating Human Shape and Pose from a Single Image," In IEEE International Conference on Computer Vision (ICCV), 2009, 8 pages.

Güler, R. A., Neverova, N. and Kokkinos, I., "DensePose: Dense Human Pose Estimation in the Wild," In IEEE Conference on Computer Vision and Pattern Recognition (CVPR), 2018, 10 pages.

He, K., Zhang, X., Ren, S. and Sun, J., "Deep Residual Learning for Image Recognition," In IEEE Conference on Computer Vision and Pattern Recognition (CVPR), 2016, 10 pages.

Hirano, D., Funayama, Y. and Maekawa, T. 3D Shape Reconstruction From 2D Images. Computer-Aided Design and Applications. 2009 CAD Solutions, LLC. Jan. 1, 2009 ;6(5):701-10, 10 pages.

Horprasert, T., Harwood, D. and Davis, L. S., "A Statistical Approach for Real-Time Robust Background Subtraction and Shadow Detection," In IEEE International Conference on Computer Vision (ICCV), 1999, 19 pages.

Joo, H., Simon, T. and Y. Sheikh, Y., "Total Capture: A 3D Deformation Model for Tracking Faces, Hands, and Bodies," In IEEE Conference on Computer Vision and Pattern Recognition (CVPR), 2018, 10 pages.

Kanazawa, A., Black, M. J., Jacobs, D. W. and Malik, J., "End-to-End Recovery of Human Shape and Pose," In IEEE Conference on Computer Vision and Pattern Recognition (CVPR), 2018, 10 pages.

Krasin, I., Duerig, T., Alldrin, N., Ferrari, V., Abu-El-Haija, S., Kuznetsova, A., Rom, H., Uijlings, J., Popov, S., Kamali, S., Malloci, M., Pont-Tuset, J., Veit, A., Belongie, S., Gomes, V., Gupta, A., Sun, C., Chechik, G., Cai, D., Feng, Z., Narayanan, D., and Murphy, K., "Openimages: A Public Dataset for Large-Scale Multi-Label and Multi-Class Image Classification," Dataset available from https://storage.googleapis.com/openimages/web/index.html, 2017.

Kundu, A., Li, Y. and Rehg, J. M., "3D-RCNN: Instance-Level 3D Object Reconstruction via Render-and-Compare," In IEEE Conference on Computer Vision and Pattern Recognition (CVPR), 2018, 10 pages.

Lassner, C., Romero, J., Kiefel, M., Bogo, F., Black, M. J. and Gehler, P. V., "Unite the People—Closing the Loop Between 3D and 2D Human Representations," In IEEE Conference on Computer Vision and Pattern Recognition (CVPR), 2017, 10 pages.

Li, K., R. Garg, M. Cai and I. Reid, "Single-view Object Shape Reconstruction Using Deep Shape Prior and Silhouette," The School of Computer Science, University of Adelaide and Australian Centre for Robotic Vision. Adelaide, Australia, arXiv preprint arXiv:1811.11921. Aug. 1, 2019, Cornell University, URL: https://arxiv.org/pdf/1811.11921.pdf, 14 pages.

Long, J., Shelhamer, E., and Darrell, T., "Fully Convolutional Networks for Semantic Segmentation, "In IEEE Conference on Computer Vision and Pattern Recognition (CVPR), 2015, 10 pages.

Loper, M., Mahmood, N., Romero, J., Pons-Moll, G. and Black, M. J., "SMPL: A Skinned Multi-Person Linear Model," ACM Trans. Graphics (Proc. SIGGRAPH Asia), 34(6):248:1-248:16, Oct. 2015, 16 pages.

(56) References Cited

OTHER PUBLICATIONS

Mülayim, A. Y., Yilmaz, U. and Atalay, V. Silhouette-based 3D Model Reconstruction from Multiple Images. IEEE Transactions on Systems, Man, and Cybernetics, Part B (Cybernetics). Jul. 22, 2003;33(4):582-91, 27 pages.

nakedlabs.com, Aug. 2, 2018 (Aug. 2, 2018), XP002801423, URL: https://web.archive.org/web/20180802014000/https://nakedlabs.com/ [Retrieved from the Internet: Dec. 16, 2020]; the whole document.

Ngiam, J., Khosla, A., Kim, M., Nam, J., Lee, H.and Ng, A. Y., "Multimodal Deep Learning," In International Conference on Machine Learning (ICML), pp. 689-696, 2011, 8 pages.

Nguyen et al., "Gender Recognition from Human-Body Images Using Visible-Light and Thermal Camera Videos Based on a Convolutional Neural Network for Image Feature Extraction," Sensors,Mar. 2017: 17(3);637, 22 pages.

Omran, M., Lassner, C., Pons-Moll, G., Gehler, P. V. and Schiele, B., "Neural Body Fitting: Unifying Deep Learning and Model-Based Human Pose and Shape Estimation," In International Conference on 3D Vision (3DV), 2018, 14 pages.

Park, S., Hwang, J. and Kwak, N. 3D Human Pose Estimation Using Convolutional Neural Networks with 2D Pose Information. In European Conference on Computer Vision, Sep. 8, 2016 (pp. 156-169), https://arxiv.org/pdf/1608.03075v2.pdf, 15 pages.

Pavlakos et al., "Expressive Body Capture: 3D Hands, Face, and Body from a Single Image," 2019 IEEE/CVF Conference on Computer Vision and Pattern Recognition (CVPR), Jun. 1, 2019, 11 pages.

Pavlakos, G., Zhu, L., Zhou, X. and Daniilidis, K., "Learning to Estimate 3D Human Pose and Shape from a Single Color Image," In IEEE Conference on Computer Vision and Pattern Recognition (CVPR), 2018, 10 pages.

Popa, A.-I., Zanfir, M. and C. Sminchisescu, C., "Deep Multitask Architecture for Integrated 2D and 3D Human Sensing," In IEEE Conference on Computer Vision and Pattern Recognition (CVPR), 2017, 10 pages.

Rhodin, H., Robertini, N., Casas, D., Richardt, C., Seidel, H.-P. and Theobalt, C., "General Automatic Human Shape and Motion Capture Using Volumetric Contour Cues," In European Conference on Computer Vision, 2016, 18 pages.

Robinette, K. M., Blackwell, S., Daanen, H., Boehmer, M., Fleming, S., Brill, T., Hoeferlin, D. and Burnsides, D., "Civilian American and European Surface Anthropometry Resource (CAESAR) Final Report," Tech. Rep. AFRL-HEWP-TR-2002-0169, US Air Force Research Laboratory, 2002, 70 pages.

Rogez, G., Weinzaepfel, P. and Schmid C. LCR-Net++: Multi-Person 2D and 3D Pose Detection in Natural Images. IEEE IEEE Transactions on Pattern Analysis and Machine Intelligence, Jan. 14, 2019;42(5): 1146-61, Downloaded on Jul. 18, 2020, 16 pages.

Sigal, L., Bălan, A. O. and Black, M. J., "Combined Discriminative and Generative Articulated Pose and Non-Rigid Shape Estimation," In Neural Information Processing Systems (NIPS), 2007, 8 pages.

Su et al., "Multi-view Convolutional Neural Networks for 3D Shape Recognition," 2015 IEEE International Conference on Computer Vision (ICCV), Dec. 7-13, 2015, Santiago, Chile, 9 pages.

Sun, J., Ovsjanikov, M. and Guibas, L., "A Concise and Provably Informative Multi-Scale Signature Based on Heat Diffusion," In Symposium on Geometry Processing, 2009, 10 pages.

Sun, X., Wu, J., Zhang, X., Zhang, Z., Zhang, C., Xue, T., Tenenbaum, J. B. and Freeman, W. T. Pix3D: Dataset and Methods for Single-Image 3D Shape Modeling. In 2018 IEEE/CVF Conference on Computer Vision and Pattern Recognition, Jun. 18, 2018 (pp. 2974-2983). IEEE, 10 pages.

Tan, J. K. V., Budvytis, I. and Cipolla, R., "Indirect Deep Structured Learning for 3D Human Body Shape and Pose Prediction," In British Machine Vision Conference, 2017, 11 pages.

TC2 Labs LLC, "SizeUSA", 3 pages, http://scan2fit.com/sizeusa/about.php.

Kato H, Ushiku Y, Harada T. Neural 3D Mesh Renderer. In Proceedings of the IEEE Conference on Computer Vision and Pattern Recognition 2018 (pp. 3907-3916).

Natsume R, Saito S, Huang Z, Chen W, Ma C, Li H, Morishima S. SiCloPe: Silhouette-Based Clothed People. arXiv preprint arXiv: 1901.00049. Dec. 31, 2018.

Pradhan, L., et al., Feature Extraction from 2D Images for Body Composition Analysis, 2015 IEEE 978-1-5090-0379-2/15, DOI 10.1109/ ISM.2015.117, pp. 45-52. (Year: 2015).

Dibra Endri et al: "HS-Nets: Estimating Human Body Shape from Silhouettes with Convolutional Neural Networks", 2016 Fourth International Conference On 3D Vision (30V), IEEE, Oct. 25, 2016 (Oct. 25, 2016), pp. 108-117, XP033027616, DOI: 10.1109/3DV. 2016.19 [retrieved on Dec. 15, 2016].

Dibra, Endri: "Recovery of the 3D Virtual Human: Monocular Estimation of 3D Shape and Pose with Data Driven Priors", May 31, 2018 (May 31, 2018), pp. 1-192, XP055648769, DOI: 10.3929/ethz-b-000266852 Retrieved from the Internet: URL: https://www.research-collection.ethz.ch/bitstream/handle/20.500.11850/266852/Endri_Dibra_Thesis_Final.pdf?sequence=3&isAllowed=y [retrieved on Dec. 3, 2019].

Huang Z, Barrett JS, Barrett K, Barrett R, Ng CM. Novel method to predict body weight in children based on age and morphological facial features. The Journal of Clinical Pharmacology. Apr. 2015;55(4):447-51.

International Search Report and Written Opinion dated Feb. 10, 2023, in related International Application No. PCT/US2022/077165.

Kocabey E, Camurcu M, Ofli F, Aytar Y, Marin J, Torralba A, Weber I. Face-to-BMI: Using computer vision to infer body mass index on social media. In Proceedings of the International AAAI Conference on Web and Social Media May 3, 2017 (vol. 11, No. 1, pp. 572-575).

Lee BJ, Jang JS, Kim JY. Prediction of body mass index from facial features of females and males. International Journal of Bio-Science and Bio-Technology. Sep. 2012;4(3):45-62.

Lee BJ, Kim JY. Predicting visceral obesity based on facial characteristics. BMC Complementary and Alternative Medicine. Dec. 2014;14(1):1-9.

Smith, Brandon M. et al: "Towards Accurate 3D Human Body Reconstruction from Silhouettes", 2019 International Conference On 3D Vision (3DV), IEEE, Sep. 16, 2019 (Sep. 16, 2019), pp. 279-288 , XP033653362, DOI: 10.1109/3DV. 2019.00039 [retrieved on Oct. 28, 2019].

Yan, Song et al: "Learning Anthropometry from Rendered Humans", Arxiv.Org, Cornell University Library, 201 Online Library Cornell University Ithaca, NY, 14853, Jan. 7, 2021 (Ja. 7, 2021), XP081853690.

\* cited by examiner

BODY DIMENSIONS FROM TWO-DIMENSIONAL BODY IMAGES

BACKGROUND

Generating body dimensions of different parts of the body (e.g., chest circumference, waist circumference, bicep circumference, etc.) is a time-consuming task. Traditionally, body dimensions were taken manually with a tape measurer, calipers, or other tools. More recently, three-dimensional body scans have become available from which body dimensions may be determined. However, three-dimensional modeling of the human body currently requires large or expensive sensors, such as stereo imaging elements, three-dimensional scanners, depth sensing devices, etc.

DETAILED DESCRIPTION

As is set forth in greater detail below, implementations of the present disclosure are directed to the collection of two-dimensional ("2D") body images of a body of a user and the determination of one or more body dimensions of the body based on the collected 2D image. Body dimensions, as used herein, include any length, circumference, ratio, etc., of any part of a body. For example, body dimensions include, but are not limited to, shoulder circumference, chest circumference, waist circumference, hip circumference, inseam length, bicep circumference, leg circumference, waist to hip ratio, chest to waist ratio, waist to height ratio, etc. Also disclosed is the generation and presentation of a 3D body model from the 2D body images.

Two-dimensional body images may be obtained from any device that includes a 2D camera, such as cell phones, tablets, laptops, etc. In other implementations, the 2D body images may be obtained from any other source, such as data storage. The 2D body images may be sent by an application executing on the device to remote computing resources that process the 2D body images to determine personalized 3D body features, to generate a personalized 3D body model of the body of the user, to determine body dimensions of the body represented in the 2D image, and/or to determine body measurements of the body of the user. Body measurements include, but are not limited to, body composition (e.g., weight, body fat, bone mass, body mass, body volume, etc.).

The application executing on the portable device receives the current body dimension information, current body measurement information, and personalized 3D body features, generates the personalized 3D body model, and presents some or all of the body dimensions, some or all of the body measurements, and/or the personalized 3D body model to the user. In some implementations, the user may interact with the personalized 3D body model to view different sides of the personalized 3D body model and/or to visualize differences in the personalized 3D body model and/or corresponding body dimensions if one or more body measurements change. For example, a user may provide a target body measurement, such as a decrease in body fat, and the disclosed implementations may generate one or more predicted personalized 3D body models and corresponding predicted body dimensions that represent a predicted appearance and predicted dimensions of the body of the user with the target body measurement(s). In some implementations, the predicted appearance and/or predicted dimensions of the body may be presented as a 3D body slider and/or other adjustor that the user may interact with to view progressive changes to the body appearance and dimensions at different body measurements.

Figure 1A:
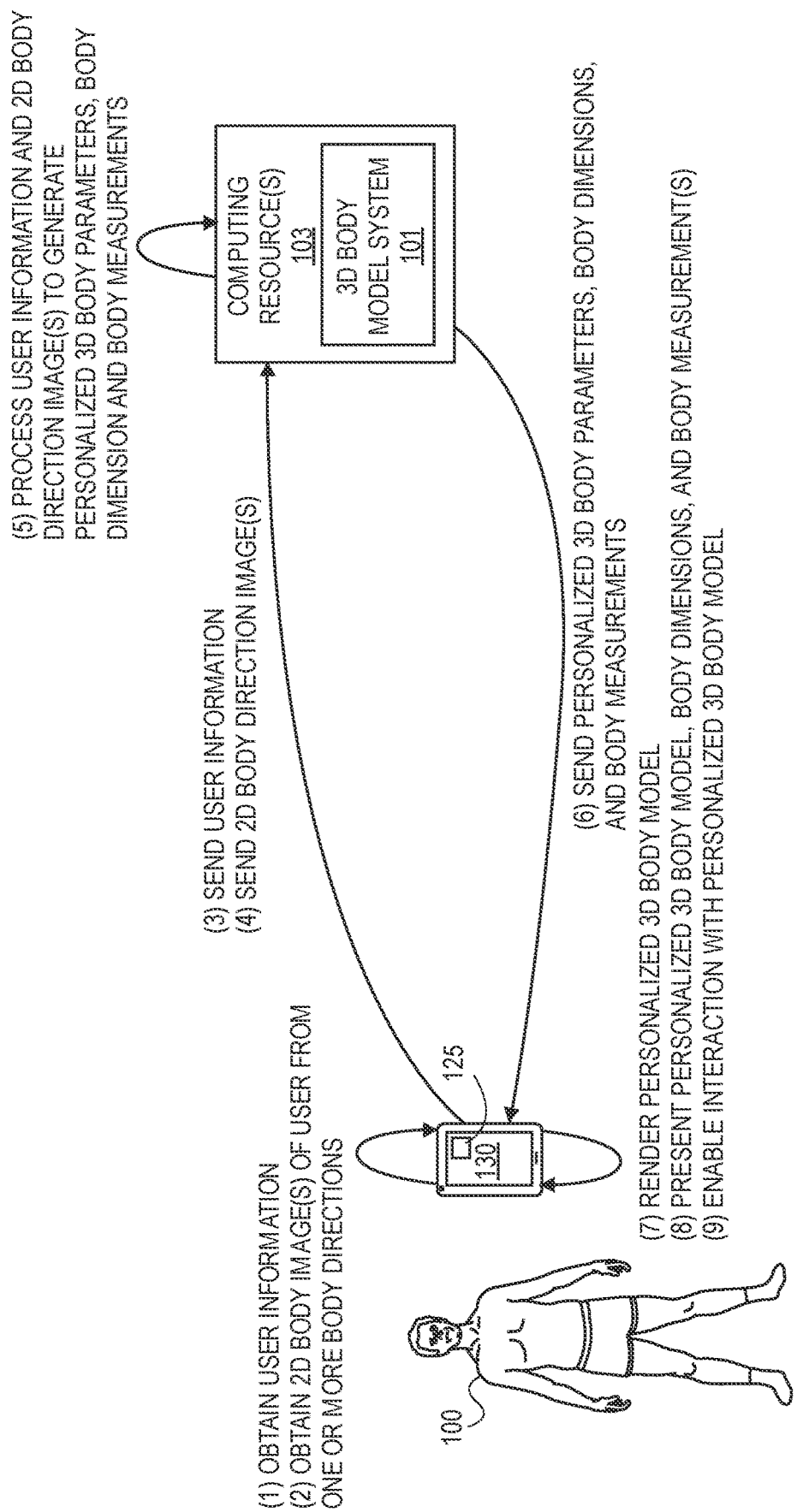
FIGS. 1A through 1B are a transition diagram of two-dimensional body image collection and processing to produce body dimensions and/or a personalized three-dimensional body model of that body that may be presented back to the user, in accordance with implementations of the present disclosure.
Figure 1B:
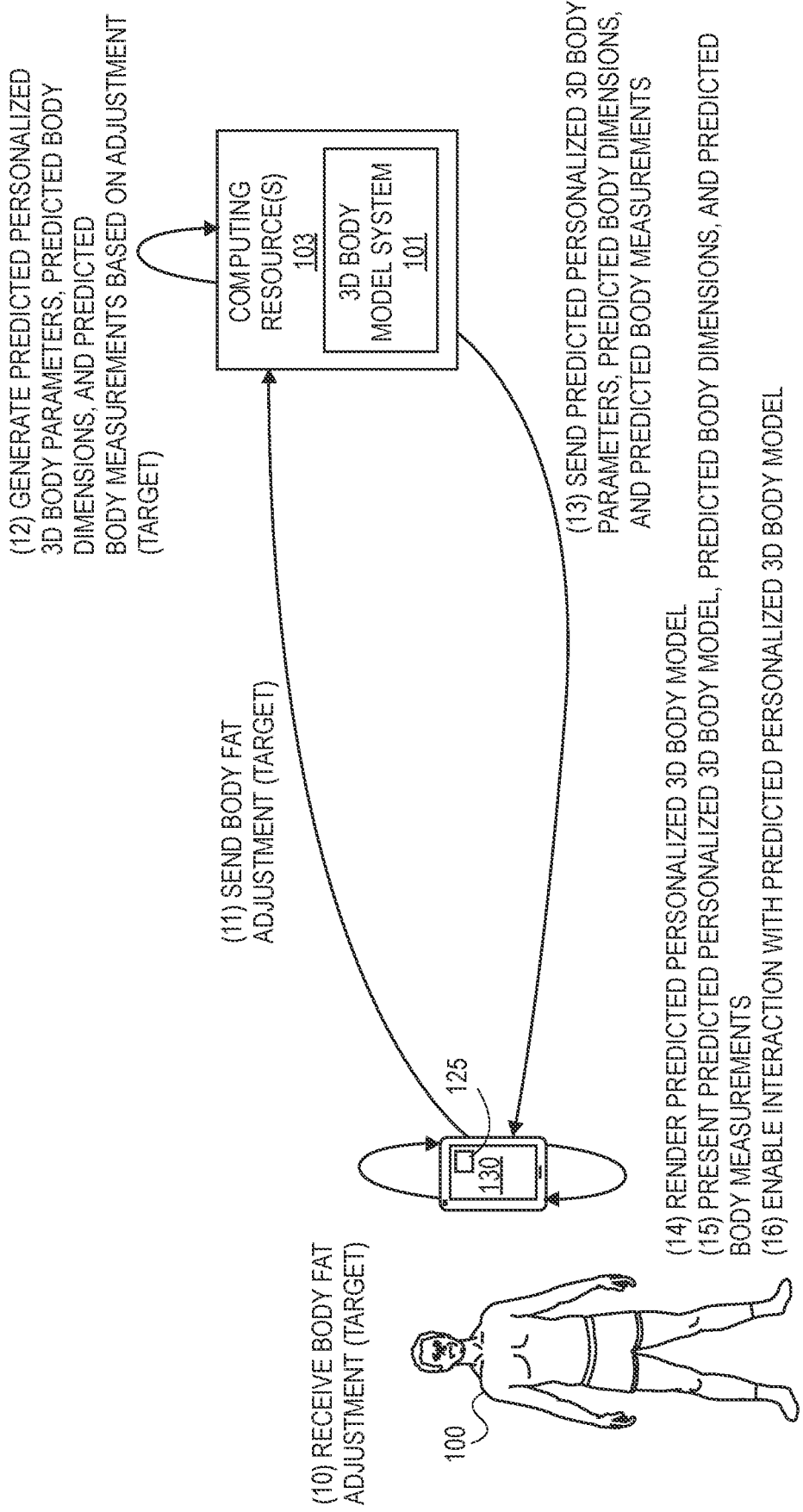
Figure 2:
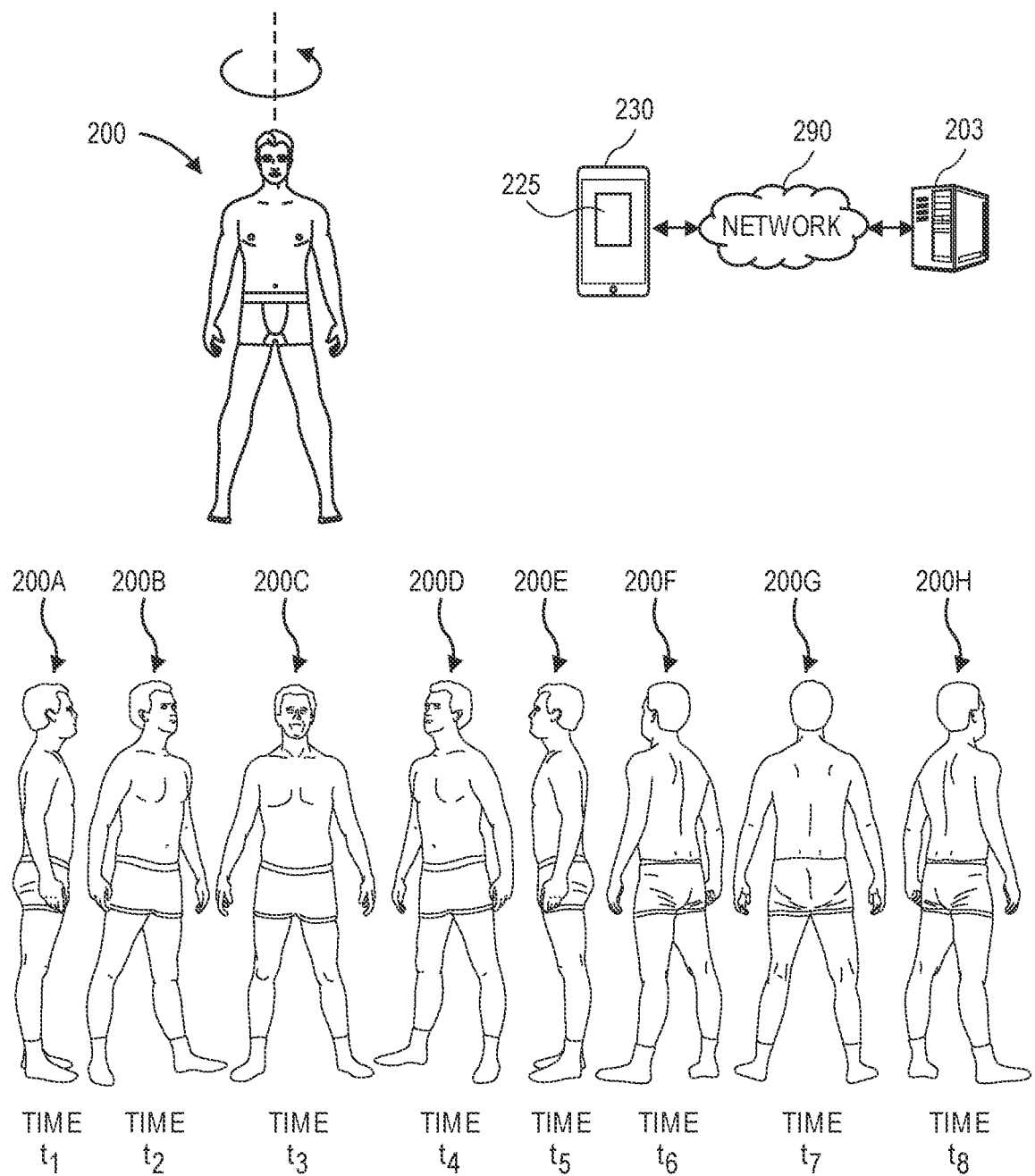
FIG. 2 illustrates different body directions of a body that may be captured in two-dimensional body images and used to produce body dimensions and/or a personalized three-dimensional body model, in accordance with implementations of the present disclosure.

FIG. 1A is a transition diagram of 2D body image collection and processing to produce a personalized 3D body model of a body of a user 100 and/or body dimensions of the body of the user that may be presented back to the user, FIG. 1B is a transition diagram of a generation of a predicted 3D body model and corresponding predicted body dimensions, and FIG. 2 illustrates examples of different orientations or body directions of a body 200, in accordance with implementations of the present disclosure.

In some implementations, a user 100/200 may execute an application 125/225 on a portable device 130/230, such as a cellular phone, tablet, laptop, etc., that includes an imaging element (e.g., camera) and interact with the application. The imaging element may be any conventional imaging element, such as a standard 2D Red, Green, Blue ("RGB") digital camera that is included on many current portable devices. Likewise, images, as discussed herein may be still images generated by the imaging element and/or images or frames extracted from video generated by the imaging element.

The user may provide user information, such as username, password, etc., to the application so that the application can identify the user and determine a user account associated with the user. Likewise, the user may provide other user information, such as body information, including but not limited to weight, height, age, gender, ethnicity, etc. The user may select which user information is provided or choose not to provide any user information. In addition, in some implementations, the user may interact with the application executing on the portable device 130/230 without providing any user identifying information (e.g., operate as a guest to the application).

Upon user identification and/or receipt of user information, the user 100/200 positions the portable device 130/230 such that a field of view of the imaging element of the portable device is substantially horizontal and facing toward the user. In some implementations, the application 125/225 executing on the portable device 130/230 may provide visual and/or audible instructions that guide the user 100/200 in the placement and positioning of the portable device 130/230. For example, the application may instruct the user 100/200 to place the portable device 130/230 between waist and head height of the user and in a substantially vertical direction (e.g., between 2 and 10 degrees of vertical) such that the imaging element is pointed toward the user and the field of view of the imaging element is substantially horizontal.

In some implementations, the application may request that the user wear a minimal amount of clothing, such as undergarments shown in FIGS. 1A, 1B, and 2. By wearing minimal clothing, processing of the 2D body image may be more accurate.

Once the portable device is properly positioned, 2D body images of the user 100/200 are captured by the imaging element of the portable device 130/230. The 2D body images are processed to determine that the user is in a defined pose, such as an "A Pose," and to determine a body direction of the body of the user with respect to the imaging element. The defined pose may be any body position that enables image capture of components of the body. In one example, the defined pose is an "A Pose" in which the arms are separated from the sides of the body and the legs are separated, for example by separating the feet of the body to about shoulder width. The A Pose allows image processing of 2D body images to distinguish between body parts (e.g., legs, arms, torso) from different angles and also aids in body direction determination. The body direction may be any direction or orientation of the body with respect to the imaging element. Example body directions include, but are not limited to, a front side body direction in which the body is facing the imaging element, a right side body direction in which the body is turned such that a right side of the body is facing the imaging element, a left side body direction in which a left side of the body is facing the imaging element, and a back side body direction in which a back of the body is facing the imaging element. As will be appreciated, any number of body directions and corresponding orientations of the body may be utilized with the disclosed implementations and the four discussed (front side, right side, back side, and left side) are provided only as examples.

In some implementations, the application 125/225 executing on the portable device 130/230 may guide the user through different body directions and select one or more 2D images as representative of each body direction. For example, referring to FIG. 2, an application 225 executing on the portable device 230 may guide the user into the proper pose, such as the "A Pose" illustrated by the body 200 of the user and then guide the user through a series of body directions 200A, 200B, 200C, 200D, 200E, 200F, 200G, and 200H in which the user rotates their body to the requested body direction and remains in the A Pose while 2D body images are generated and one or more of those 2D body images are selected by the application as a 2D body direction image corresponding to the current body direction of the body of the user. In the example illustrated in FIG. 2, eight different 2D body direction images are selected by the application 225 executing on the portable device 230, one for each respective body direction 200A, 200B, 200C, 200D, 200E, 200F, 200G, and 200H.

Returning back to FIG. 1A, as each 2D body direction image is selected by the application, or after all 2D body direction images are selected, the 2D body direction images are sent from the application 125/225 executing on the portable device 130/230 via a network 290 (FIG. 2) to remote computing resources 103/203 for further processing. In addition, the user information provided to the application by the user 100/200 may be sent from the application executing on the portable device 130/230 to the remote computing resources 103/203. In other implementations, all processing may be done on the portable device. In still other examples, as images are generated, the images may be sent to the remote computing resources 103/203 and processed by the remote computing resources 103/203 to select the body direction images.

The remote computing resources 103/203 may include a 3D body model system 101 that receives the user information and/or the 2D body direction images and processes those images using one or more neural networks, such as a convolutional neural network, to generate personalized 3D body features corresponding to a personalized 3D body model of the body of the user 100/200. In addition, one or more of the 2D body direction images, such as front side 2D body direction image may be processed to determine one or more additional body measurements, such as body fat percentage, body mass, bone density, muscle mass, etc. Still further, one or more of the 2D body direction images may be processed, as discussed further below, to determine one or more body dimensions of the user, such as shoulder circumference, waist circumference, waist-to-hip ratio, etc.

The 3D body model system 101, upon generating the personalized 3D body features, body dimensions and body measurement sends the personalized 3D body features, body dimensions, and body measurements back to the application 125/225 executing the portable device 130/230. The application 125/225, upon receipt of the personalized 3D body features, body dimensions, and body measurements generates, from the personalized 3D body features, a personalized 3D body model that is representative of the body 100/200 of the user and presents the personalized 3D body model, one or more body dimensions, and one or more body measurements on a display of the portable device 130/230.

In addition to rendering and presenting the personalized 3D body model, one or more body dimensions, and/or one or more body measurements may be presented. In some implementations, the user 100/200 can interact with the presented personalized 3D body model, body dimensions, and body measurements. For example, the user may view historical information that was previously collected for the user via the application 125/225. The user may also interact with the presented personalized 3D body model to rotate and/or turn the presented personalized 3D body model. For example, if the portable device 130/230 includes a touch-based display, the user may use the touch-based display to interact with the application and rotate the presented personalized 3D body model to view different views (e.g., front, side, back) of the personalized 3D body model.

Likewise, in some implementations, the user may view body dimension information with respect to a larger population or cohort to which the user is associated (e.g., based on age, fitness level, height, weight, gender, etc.). For example, the user may view body dimension information relative to body dimension information of other people that are within five years of age of the user and of a same gender as the user.

In some implementations, as part of interaction with the application 125/225, the user 100/200 may provide one or more adjustments to body measurements, referred to herein as targets. For example, a user may request to alter the body fat measurement value of the body by a defined amount (e.g., from 25% to 20%), alter the muscle mass by a defined amount, alter the body weight a defined amount, etc. In other implementations, in addition to altering one or more body measurements, the user may specify one or more activities (e.g., exercise, nutrition, sleep) that should cause adjustments to one or more body measurements.

In the example illustrated in FIG. 1B, the user provides a body fat measurement adjustment to a target body fat measurement value. Upon receipt of the target body fat measurement value, the application 125/225 executing on the portable device 130/230 sends the target body fat measurement value to the remote computing resources 103/203 for further processing. The remote computing resources 103/203 and the 3D body model system 101 process the received target body fat measurement value along with other current body measurements and the personalized 3D body features to generate predicted personalized 3D body features, predicted body dimensions, and predicted body measurements that correspond to the target body fat measurement value and/or the selected activity.

The remote computing resources 103/203 may then send the predicted personalized 3D body features, predicted body dimensions, and predicted body measurements to the application 125/225 and the application 125/225 may render a predicted 3D body model based on the received predicted personalized 3D body features. Similar to the personalized 3D body model, the application 125/225 may present the predicted 3D body model, one or more predicted body dimensions, and/or one or more of the predicted body measurements to the user and enable interaction by the user with the predicted personalized 3D body model, predicted body dimensions, and/or predicted body measurements. As discussed further below, in some implementations, the user may be able to alter views between the personalized 3D body model and the predicted personalized 3D body model. In other implementations, the application 125/225 may integrate the personalized 3D body model and the predicted personalized 3D body model to produce a 3D body slider and/or other adjustor (e.g., radio button, dial, etc.) that provides the user with a continuous view of different appearances of the body and/or different body dimensions of the body at different body measurements between the current body measurements and the predicted body measurements. The 3D body slider and/or other adjustor, which relates to any type of controller or adjustor that may be used to present different appearances of the body and/or different body dimensions of the body at different body measurements is referred to herein generally as a "3D body model adjustor."

Figure 3A:
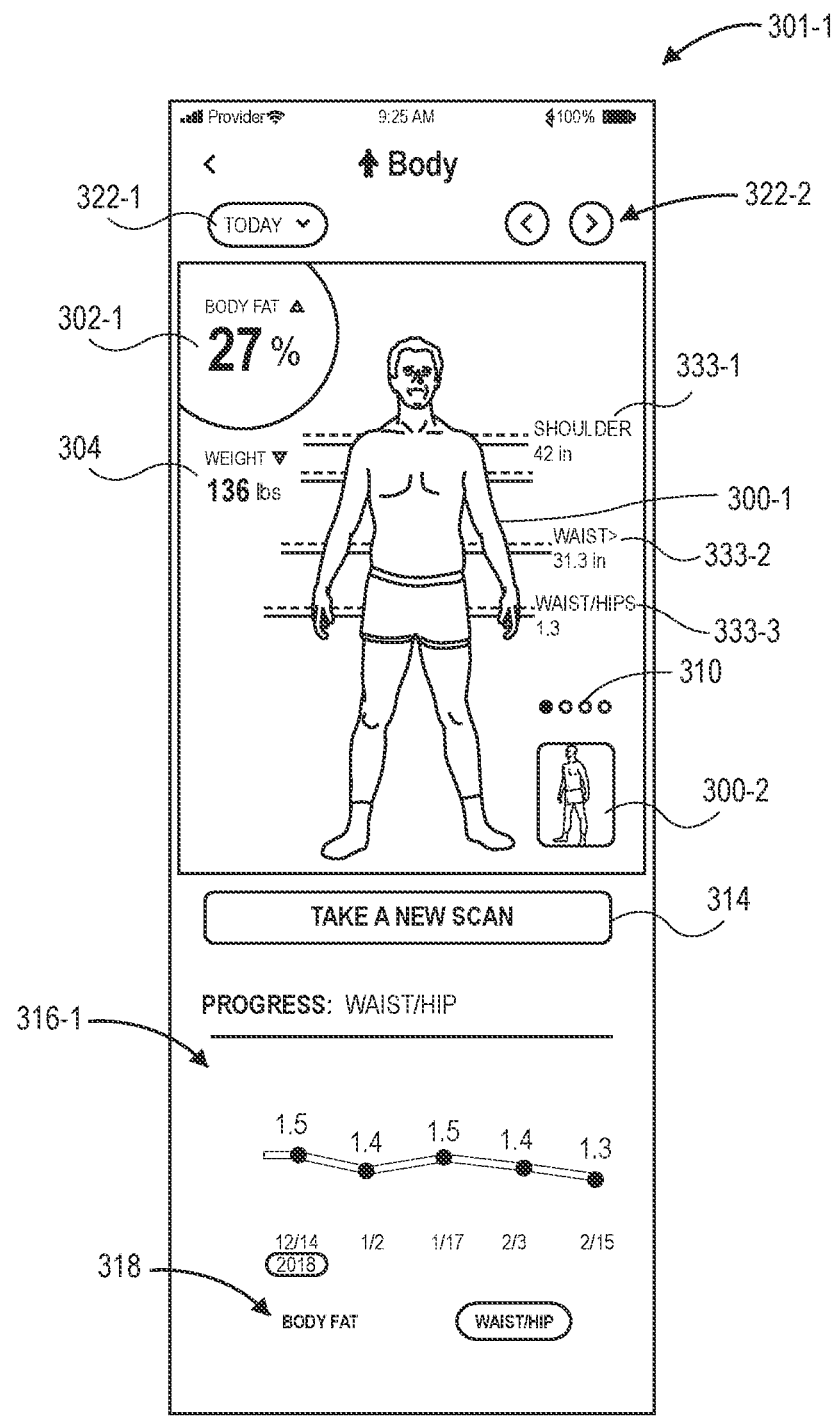
FIG. 3A is a user interface illustrating a captured two-dimensional body image, corresponding body dimensions, and body measurements determined from at least the two-dimensional body image, in accordance with implementations of the present disclosure.

FIG. 3A is a user interface 301-1 presented by an application executing on a portable device, such as the application 125/225 executing on the portable device 130/230 discussed above with respect to FIGS. 1A, 1B, and 2, in accordance with implementations of the present disclosure.

In this example, the user interface 301-1 illustrates a 2D body direction image 300-1 captured by an imaging element of the portable device that was used to generate and present a personalized 3D body model, corresponding body dimension information and corresponding body measurement information. In this example, the illustrated user interface 301-1 shows the 2D body direction image, body dimensions, including the shoulder circumference 333-1, waist circumference 333-2, and waist/hip ratio 333-3, and body measurements, including the body fat percentage 302-1 determined for the body, and the weight 304 of the body. As will be appreciated, additional or less body dimensions and/or body measurements may be included on the user interface 301-1. For example, additional body dimensions, such as bicep circumference, waist to height ratio, thigh circumference, etc., may optionally be presented on the user interface. In some examples, a user may select which body dimensions and/or body measurements are presented.

Figure 3B:
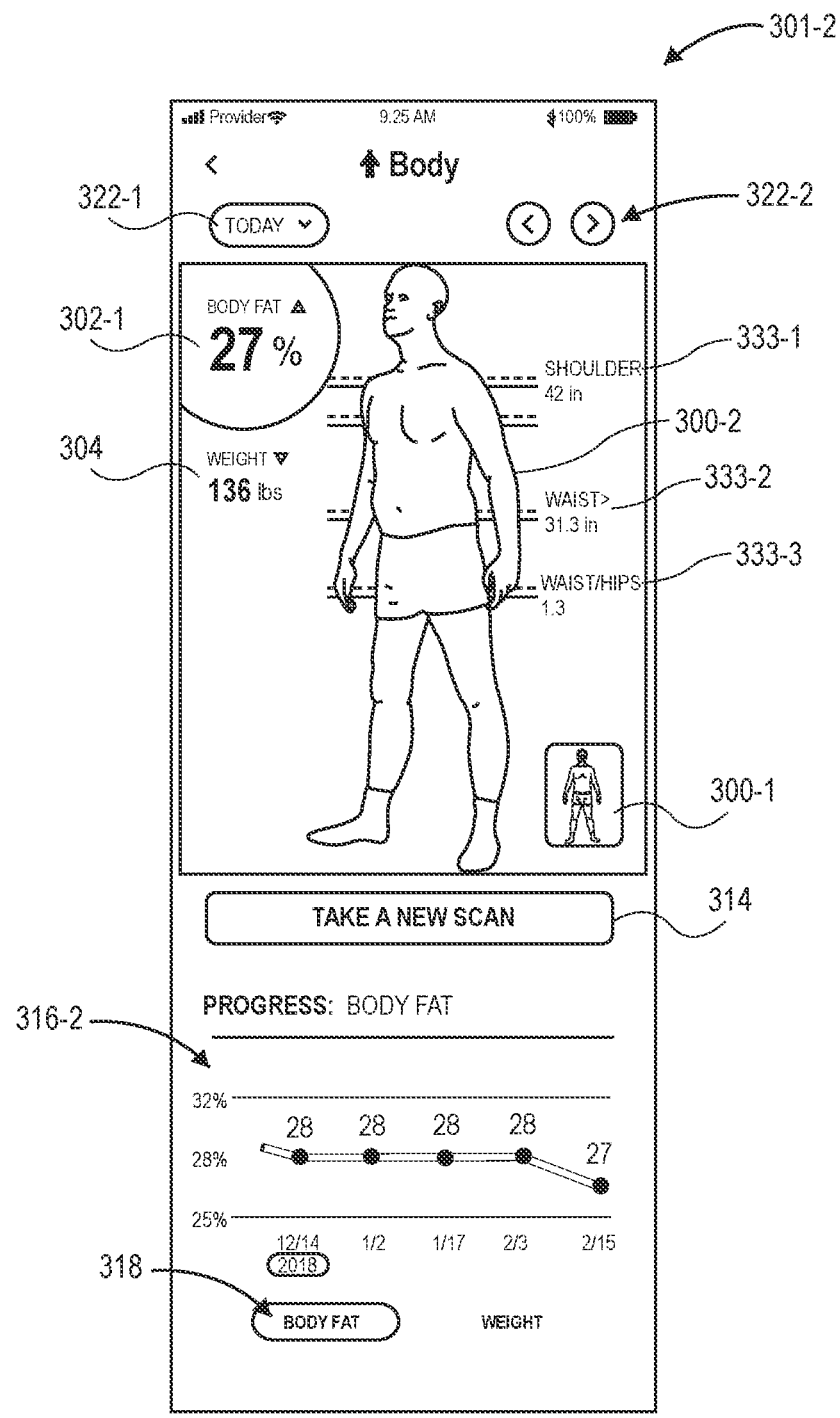
FIG. 3B is a user interface illustrating a personalized three-dimensional body model, body dimensions, and corresponding body measurements generated from a two-dimensional body image, in accordance with implementations of the present disclosure.

As discussed further below, the body dimensions may be determined from the 2D body direction image 300-1. Likewise, the body measurements may be determined from the 2D body direction image 300-1 and/or provided as user information by the user. In other implementations, additional or fewer body dimensions and/or additional or fewer body measurements may be presented on the user interface 301-1 by the application 125/225. A user interacting with the user interface 301-1 may also select to view other 2D body direction images that were used to generate a personalized 3D body model, other body dimensions determined for the body, and/or other body measurements determined for the body, by selecting the indicators 310 and/or swiping or otherwise interacting with the user interface 301-1 to alter the currently presented 2D body direction image 300-1. The user may also alternate between a view of 2D body direction images 300-1, as illustrated in the user interface 301-1 of FIG. 3A and the rendered and presented personalized 3D body model 300-2, as illustrated in the small image presentation of the personalized 3D body model 300-2 in FIG. 3A and as illustrated as the primary image 300-2 in user interface 301-2 of FIG. 3B. Referring briefly to FIG. 3B, the user may interact with to rotate and/or change the view of the personalized 3D body model 300-2 by directly interacting with the personalized 3D body model 300-2. For example, the user may rotate the presentation of the personalized 3D body model to view different portions of the personalized 3D body model, zoom out to view more of the personalized 3D body model, or zoom in to view details corresponding to a portion of the personalized 3D body model.

In some implementations, if the user has utilized the application 125/225 over a period of time to generate multiple instances of personalized 3D body models of the user, the user interface may also present historical body measurements and/or body dimensions 316 corresponding to the different dates in which 2D body images of the body of the user were captured and used to generate a personalized 3D body model, body dimensions, and body measurements of the body of the user. In the illustrated example, the user may select between viewing historical waist/hip ratio 316-1 (a body dimension) as illustrated in FIG. 3A and body fat percentage 316-2 (a body measurement), as illustrated in FIG. 3B, through selection of the toggle control 318. In other implementations, different or additional historical body dimensions and/or body measurements may be accessible through the user interface 301.

In addition to viewing historical body dimensions and/or body measurements, the user may also access and view either the 2D body images that were collected at those prior points in time and/or view the personalized 3D body models generated from those prior 2D body images, through selection of the date control 322-1 or the arrow control 322-2.

The user may also interact with the user interface 301-1 to select to take a new scan of their body by selecting the Take A New Scan control 314. In response to a user selecting the Take A New Scan control 314, the application executing on the portable device will provide instructions to the user to position the user in the defined pose (e.g., A Pose) and at proper body directions so that 2D body direction images can be generated and used to produce a personalized 3D body model, body dimensions, and body measurements of the body of the user, as discussed herein.

In some implementations, a user may also interact with the application 125/225 to predict an appearance of the body with different body measurements (e.g., changes in body fat percentage and/or changes in muscle mass).

Figure 3C:
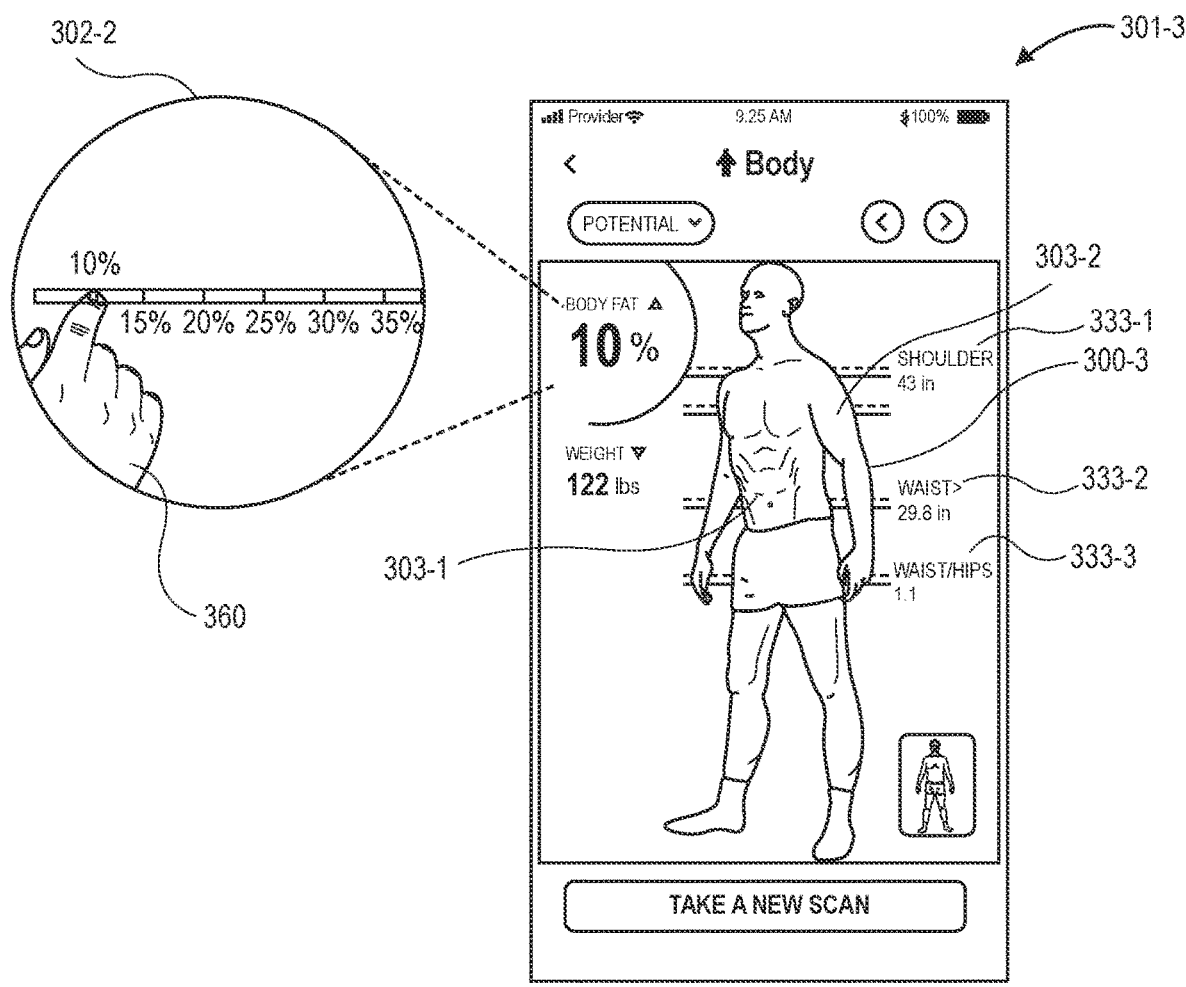
FIG. 3C is a user interface illustrating an example 3D body model adjustor in the form of a slider adjustment and resulting predicted personalized three-dimensional body model, corresponding predicted body dimensions, and corresponding predicted body measurements, in accordance with implementations of the present disclosure.

For example, FIG. 3C is a user interface illustrating an example 3D body model adjustor in the form of a slider adjustment and resulting predicted three-dimensional body model, corresponding body dimensions, and corresponding body measurements, in accordance with implementations of the present disclosure. As illustrated, a user may interact with the user interface 301-3 to alter one or more body measurements and the application executing on the device will generate a predicted personalized 3D body model 300-3, predicted body dimensions, and predicted body measurements in accordance with the altered body measurements, in accordance with implementations of the present disclosure. In the illustrated example, the user is using their hand 360 to interact with a single slider 302-2 presented on the user interface 301-3 to alter the body fat measurement value, in this example from the computed 27% to 10%.

In response to receiving the target body measurement, in this example the reduced body fat measurement value, the disclosed implementations, as discussed further below, generate and present a predicted personalized 3D body model 300-3, predicted body dimensions, and predicted body measurements representative of a predicted appearance of the body of the user with the target body measurement. The predicted personalized 3D body model 300-3 may be predicted and rendered based on the personalized 3D body model and corresponding personalized 3D body features determined for the body of the user. Likewise, shading and contours, such as shading to show stomach muscle definition 303-1 or body dimensions changes, such as increased bicep circumference 303-2, increased shoulder circumference 333-1, decreased waist circumference 333-2, decreased waist/hip ratio 333-3, etc., may be generated and presented with the presentation of the predicted personalized 3D body model.

The predicted body dimensions may be determined from the predicted personalized 3D body model and/or from the trained machine learning model. For example, the predicted personalized 3D body model may be used to generate a predicted personalized silhouette that may be used, as discussed herein, to generate predicted body dimensions. Alternatively, based on the target body measurement, a synthetic body model may be selected or generated and a silhouette generated by the synthetic body model that corresponds to the target body measurements. The silhouette may then be used, as discussed herein, to determine predicted body dimensions corresponding to the target body measurement.

Like the other rendered and presented personalized 3D body models, the user may interact with the presented predicted personalized 3D body model 300-3 to view different portions or aspects of the predicted personalized 3D body model.

While the example illustrated in FIG. 3C shows alteration of the body fat percentage, in other examples, a user may select to alter other body measurements, such as body weight, muscle mass, etc. Likewise, in some examples, based on a change to one body measurement, other body measurements and/or body dimensions may be automatically changed to correspond to the changed body measurement. For example, if the user changes the body fat percentage from 27% to 10%, as in the illustrated example, the application executing on the portable device may determine that in most instances a change in that amount of body fat percentage also typically results in a weight change from the determined 136 pounds to 115 pounds. The user may accept this anticipated change to other body measurements and/or body dimensions, provide other inputs for those body measurements and/or body dimensions, or select to leave those body measurements/body dimensions unchanged.

In still other examples, a user may be able to interact with a multi-dimensional slider and specify different changes to body measurements and/or activities. In some implementations, some or all of the sliders of the multi-dimensional slider may be interconnected such that a change to one slider may results in a change or adjustment to another slider. In other implementations, other forms of multi-dimensional 3D body model adjustors may also be presented.

Figure 3D:
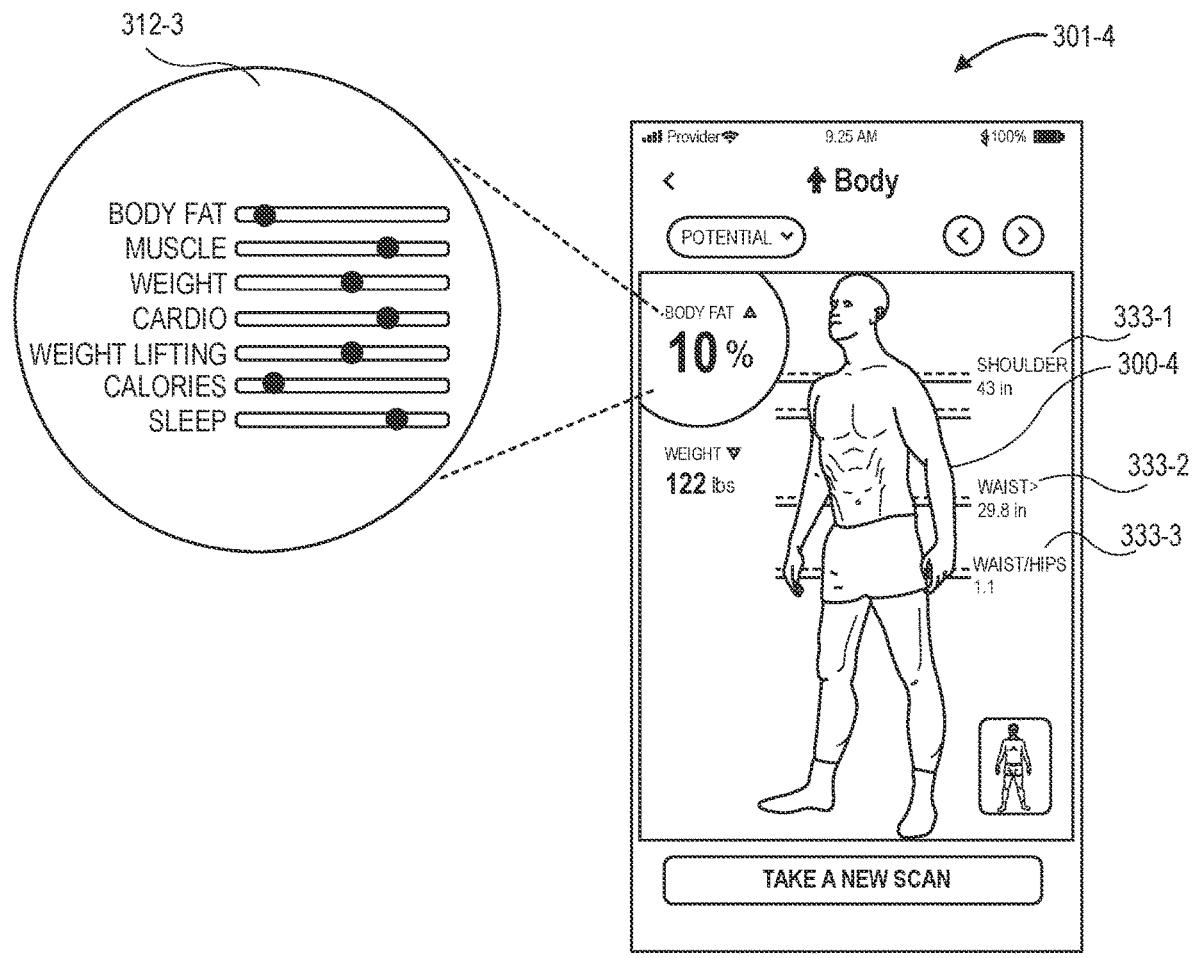
FIG. 3D is a user interface illustrating another example 3D body model adjustor in the form of a multi-dimensional slider adjustment and resulting predicted personalized three-dimensional body model, corresponding predicted body dimensions, and corresponding predicted body measurements, in accordance with implementations of the present disclosure.

FIG. 3D is a user interface 301-4 illustrating another example 3D body model adjustor in the form of a multi-dimensional slider 312-3 adjustment and resulting predicted personalized 3D body model 300-4 and predicted body dimensions 333-1, 333-2, 333-3, in accordance with implementations of the present disclosure. In this example, the user may interact with a multi-dimensional slider 312-3 to adjust one or more body measurements and/or activity levels. In this example, the user may adjust the body fat measurement value, muscle mass measurement of the body, weight of the body, the amount of time they do cardio exercises, lift weights, the number of calories consumed, and/or the number of hours the user sleeps. In other implementations, the sliders may represent other body measurements (e.g., muscle mass, weight, etc.) and/or other activities that may be changed by the user and utilized by the disclosed implementations as targets for use in computing predicted personalized 3D body features and corresponding predicted personalized 3D body models.

Figure 4:
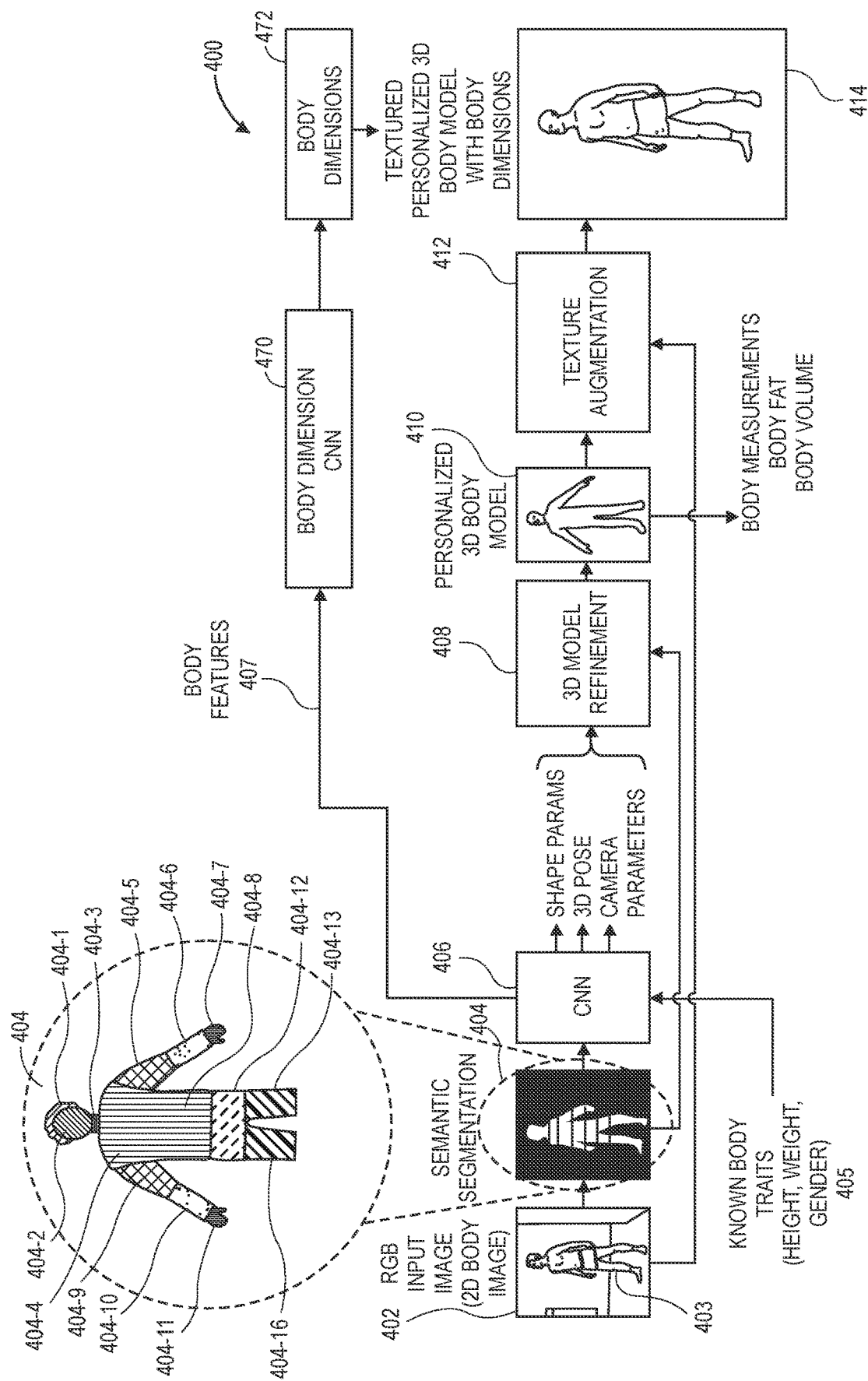
FIG. 4 is a transition diagram of processing two-dimensional body images to produce a personalized three-dimensional model of that body and corresponding body dimensions, in accordance with implementations of the present disclosure.

FIG. 4 is a transition diagram 400 of processing 2D body images of a body to produce a personalized 3D body model and body dimensions of that body, in accordance with implementations of the present disclosure.

3D modeling and body dimension determination of a body from 2D body images begins with the receipt or creation of a 2D body image 402 that includes a representation of the body 403 of the user to be modeled. As discussed above, 2D body images 402 for use with the disclosed implementations may be generated using any conventional imaging element, such as a standard 2D Red, Green, Blue ("RGB") digital camera that is included on many current portable devices (e.g., tablets, cellular phones, laptops, etc.). The 2D body image may be a still image generated by the imaging element or an image extracted from video generated by the imaging element. Likewise, any number of images may be used with the disclosed implementations.

As discussed, the user may be instructed to stand in a particular orientation (e.g., front facing toward the imaging element, side facing toward the imaging element, back facing toward the imaging element, etc.) and/or to stand in a particular pose, such as an "A pose". Likewise, the user may be instructed to stand a distance from the camera such that the body of the user is completely or partially included in a field of view of the imaging element and represented in the generated image 402. Still further, in some implementations, the imaging element may be aligned or positioned at a fixed or stationary point and at a fixed or stationary angle so that images generated by the imaging element are each from the same perspective and encompass the same field of view.

As will be appreciated, a user may elect or opt-in to having a personalized 3D body model of the body of the user generated and may also select whether the generated personalized 3D body model and/or other information, such as determined body dimensions, may be used for further training of the disclosed implementations and/or for other purposes.

The 2D body image 402 that includes a representation of the body 403 of the user may then be processed to produce a segmented silhouette 404 of the body 403 of the user represented in the image 402. A variety of techniques may be used to generate the silhouette 404. For example, background subtraction may be used to subtract or black out pixels of the image that correspond to a background of the image while pixels corresponding to the body 403 of user (i.e., foreground) may be assigned a white or other color values. In another example, a semantic segmentation algorithm may be utilized to label background and body (foreground) pixels and/or to identify different segments of the body. For example, a convolutional neural network ("CNN") may be trained with a semantic segmentation algorithm to determine bodies, such as human bodies, in images and/or to determine body segments (e.g., head segment, neck segment, torso segment, left arm segment, etc.).

In addition or as an alternative thereto, the segmented silhouette may be segmented into one or more body segments, such as hair segment 404-1, head segment 404-2, neck segment 404-3, upper clothing segment 404-4, upper left arm 404-5, lower left arm 404-6, left hand 404-7, torso 404-8, upper right arm 404-9, lower right arm 404-10, right hand 404-11, lower clothing 404-12, upper left leg 404-13, upper right leg 404-16, etc. For example, the CNN may be trained with a semantic segmentation algorithm to predict for each pixel of an image the likelihood that the pixel corresponds to a segment label (e.g., hair, upper clothing, lower clothing, head, upper right arm, etc.). For example, the CNN may be trained to process each 2D body image and output, for each pixel of each image, a vector that indicates a probability for each label that the pixel corresponds to that label. For example, if there are twenty-three labels (e.g., body segments) for which the CNN is trained, the CNN may generate, for each pixel of a 2D image, a vector that includes a probability score for each of the twenty-three labels indicating the likelihood that the pixel corresponds to the respective label. As a result, each pixel of an image may be associated with a segment based on the probability scores indicated in the vector. For segments for which the CNN is trained but are not represented in the 2D image, the CNN will provide low or zero probability scores for each label indicated in the vector, thereby indicating that the segment is not visible in the 2D body image.

In some implementations, the silhouette of the body of the user may be normalized in height and centered in the image. This may be done to further simplify and standardize inputs to a CNN to those on which the CNN was trained. Likewise, a silhouette of the body of the user may be preferred over the representation of the body of the user so that the CNN can focus only on body shape and not skin tone, texture, clothing, etc.

The silhouette 404 of the body may then be processed by one or more other CNNs 406 that are trained to determine body traits, also referred to herein as body features, representative of the body and to produce personalized 3D body features that are used to determine body dimensions of the body and a personalized 3D body model of the body. The body features may be represented as a set of neural network weights representative of different aspects of the body. In some implementations, the CNN 406 may be trained for multi-mode input to receive as inputs to the CNN the silhouette 404, and one or more known body attributes 405 of the body of the user. For example, a user may provide a height of the body of the user, a weight of the body of the user, a gender of the body of the user, etc., and the CNN may receive one or more of those provided attributes as an input.

Based on the received inputs, the CNN 406 generates body features 407 corresponding to the body and personalized 3D body features, such as 3D joint locations, body volume, shape of the body, pose angles, etc. In some implementations, the CNN 406 may be trained to predict hundreds of body features of the body represented in the image 402.

The body dimensions CNN 470 processes the body features 407 and determines body dimensions 472 for the body, as discussed further below. Likewise, a personalized 3D body model of the body is generated based on the personalized 3D body features. For example, to generate the personalized 3D body model, the personalized 3D body features may be provided to a body model, such as the Shape Completion and Animation of People ("SCAPE") body model, a Skinned Multi-Person Linear ("SMPL") body model, etc., and the body model may generate the personalized 3D body model of the body of the user based on those predicted body features.

In some implementations, as discussed further below, personalized 3D model refinement 408 may be performed to refine or revise the generated personalized 3D body model to better represent the body of the user. For example, the personalized 3D body model may be compared to the representation of the body 403 of the user in the image 402 to determine differences between the shape of the body 403 of the user represented in the image 402 and the shape of the personalized 3D body model. Based on the determined differences, the silhouette 404 may be refined and the refined silhouette processed by the CNN 406 to produce a refined personalized 3D body model of the body of the user. This refinement may continue until there is no or little difference between the shape of the body 403 of the user represented in the image 402 and the shape of the personalized 3D body model 410. In other implementations, a 2D model image may be generated from the personalized 3D body model and that 2D model image may be compared to the silhouette and/or the 2D body image to determine differences between the 2D model image and the 2D body image or silhouette. Based on the determined differences, the personalized 3D body features and/or the personalized 3D body model may be refined until the personalized 3D body model corresponds to the body of the user represented in the 2D body image and/or the silhouette.

Still further, in some implementations, the personalized 3D body model 410 of the body of the user may be augmented with one or more textures, texture augmentation 412, determined from the image 402 of the body of the user. For example, the personalized 3D body model may be augmented to have a same or similar color to a skin color of the body 403 represented in the image 402, clothing or clothing colors represented in the image 402 may be used to augment the personalized 3D body model, facial features, hair, hair color, etc., of the body of the user represented in the image 402 may be determined and used to augment the personalized 3D body model, etc.

The result of the processing illustrated in the transition 400 is a personalized 3D body model 414 or avatar representative of the body of the user, that has been generated from 2D body images of the body of the user. In addition, determined body dimensions may be presented with the personalized 3D body model 414, as illustrated above.

Figure 5A:
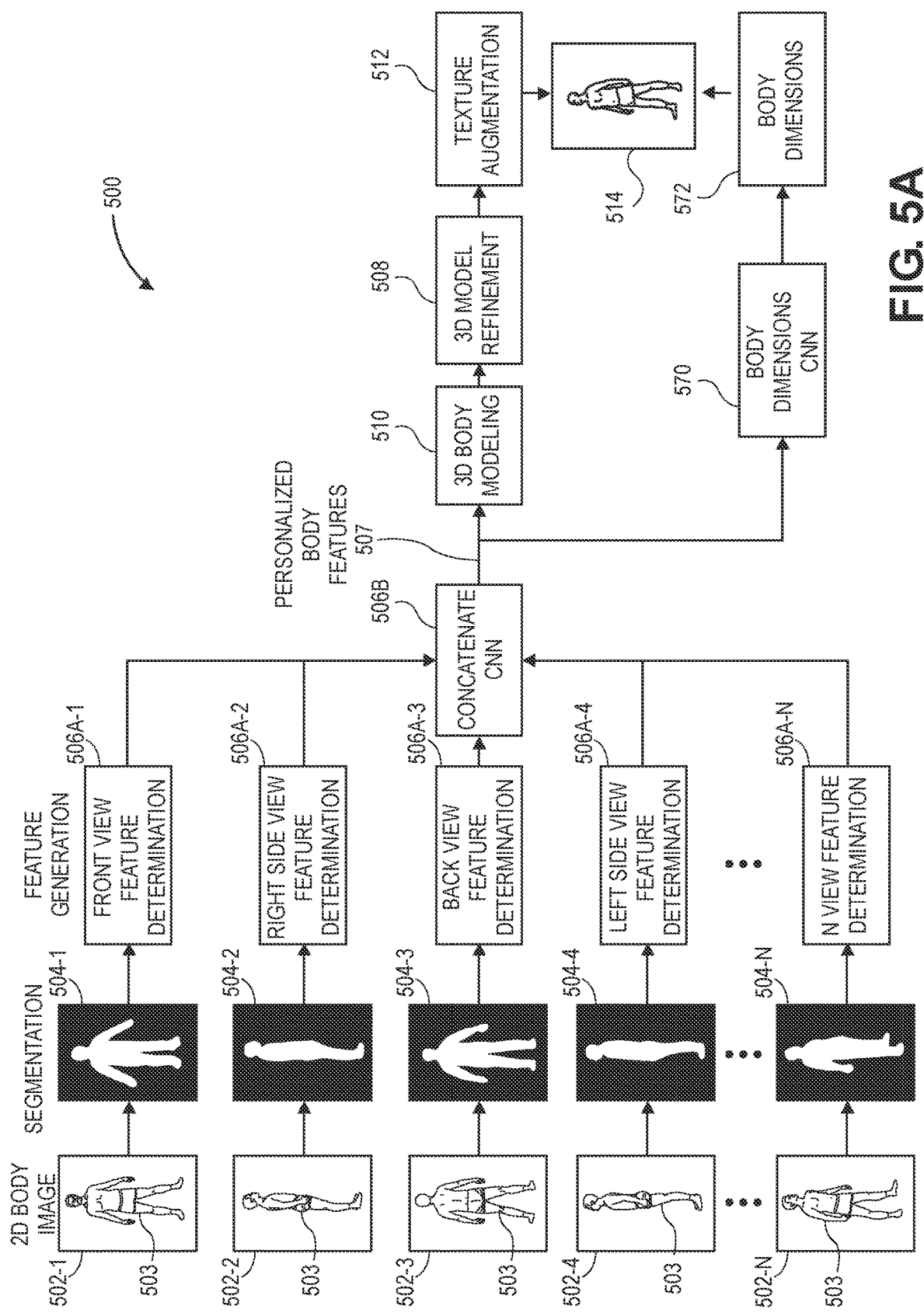
FIG. 5A is another transition diagram of processing two-dimensional body images to produce a personalized three-dimensional model of that body and corresponding body dimensions, in accordance with implementations of the present disclosure.

FIG. 5A is another transition diagram 500 of processing 2D body images 502 of a body to produce a personalized 3D body model and body dimensions of that body, in accordance with implementations of the present disclosure.

In some implementations, multiple 2D body images of a body from different views (e.g., front view, side view, back view, three-quarter view, etc.), such as 2D body images 502-1, 502-2, 502-3, 502-4 through 502-N may be utilized with the disclosed implementations to generate a personalized 3D body model of the body. In the illustrated example, the first 2D body image 502-1 is an image of a human body 503 oriented in a front view facing a 2D imaging element. The second 2D body image 502-2 is an image of the human body 503 oriented in a first side view facing the 2D imaging element. The third 2D body image 502-3 is an image of the human body 503 oriented in a back view facing the 2D imaging element. The fourth 2D body image 502-4 is an image of the human body 503 oriented in a second side view facing the 2D imaging element. As will be appreciated, any number of 2D body images 502-1 through 502-N may be generated with the view of the human body 503 in any number or orientations with respect to the 2D imaging element.

Each of the 2D body images 502-1 through 502-N are processed to segment pixels of the image that represent the human body from pixels of the image that do not represent the human body to produce a silhouette 504 of the human body as represented in that image. Segmentation may be done through, for example, background subtraction, semantic segmentation, etc. In one example, a baseline image of the background may be known and used to subtract out pixels of the image that correspond to pixels of the baseline image, thereby leaving only foreground pixels that represent the human body. The background pixels may be assigned RGB color values for black (i.e., 0, 0, 0). The remaining pixels may be assigned RGB values for white (i.e., 255, 255, 255) to produce the silhouette 504 or binary segmentation of the human body.

In another example, a CNN utilizing a semantic segmentation algorithm may be trained using images of human bodies, or simulated human bodies to train the CNN to distinguish between pixels that represent human bodies and pixels that do not represent human bodies and optionally to identify pixels of different segments of the human body. In such an example, the CNN may process the image 502 and indicate or label pixels that represent the body (foreground) and pixels that do not represent the body (background). The background pixels may be assigned RGB color values for black (i.e., 0, 0, 0). The remaining pixels may be assigned RGB values for white (i.e., 255, 255, 255) to produce the silhouette or binary segmentation of the human body. For segmentation, pixels may be further processed to determine body segments of the body to which the pixels correspond.

In other implementations, other forms or algorithms, such as edge detection, shape detection, etc., may be used to determine pixels of the image 502 that represent the body and pixels of the image 502 that do not represent the body and a silhouette 504 of the body produced therefrom.

Returning to FIG. 5A, the first 2D body image 502-1 is processed to segment a plurality of pixels of the first 2D body image 502-1 that represent the human body from a plurality of pixels of the first 2D body image 502-1 that do not represent the human body, to produce a front silhouette 504-1 of the human body. The second 2D body image 502-2 is processed to segment a plurality of pixels of the second 2D body image 502-2 that represent the human body from a plurality of pixels of the second 2D body image 502-2 that do not represent the human body, to produce a first side silhouette 504-2 of the human body. The third 2D body image 502-3 is processed to segment a plurality of pixels of the third 2D body image 502-3 that represent the human body from a plurality of pixels of the third 2D body image 502-3 that do not represent the human body, to produce a back silhouette 504-3 of the human body. The fourth 2D body image 502-4 is processed to segment a plurality of pixels of the fourth 2D body image 502-4 that represent the human body from a plurality of pixels of the fourth 2D body image 502-4 that do not represent the human body, to produce a second side silhouette 504-4 of the human body. Processing of the 2D body images 502-1 through 502-N to produce silhouettes 504-1 through 504-N from different orientations of the human body 503 may be performed for any number of images 502.

As discussed above with respect to FIG. 4, in some implementations, the silhouette may be segmented into different body segments by processing the pixels of the 2D image to determine a likelihood that the pixel corresponds to a segment label (e.g., hair, upper clothing, lower clothing, head, upper right arm, upper left leg, etc.).

In some implementations, in addition to generating a silhouette 504 from the 2D body image, the silhouette may be normalized in size and centered in the image. For example, the silhouette may be cropped by computing a bounding rectangle around the silhouette 504. The silhouette 504 may then be resized according to s, which is a function of a known height h of the user represented in the 2D body image (e.g., the height may be provided by the user):

$$s = h * \frac{0.8 * image_h}{\mu_h} \quad (1)$$

Where $image_h$ is the input image height, which may be based on the pixels of the image, and $\mu_h$ is the average height of a person (e.g., ~160 centimeters for females; ~176 centimeters for males).

Each silhouette 504 representative of the body may then be processed to determine body traits or features of the human body. For example, different CNNs may be trained using silhouettes of bodies, such as human bodies, from different orientations with known features. In some implementations, different CNNs may be trained for different orientations. For example, a first CNN 506A-1 may be trained to determine front view features from front view silhouettes 504-1. A second CNN 506A-2 may be trained to determine right side features from right side silhouettes. A third CNN 506A-3 may be trained to determine back view features from back view silhouettes. A fourth CNN 506A-4 may be trained to determine left side features from left side silhouettes. Different CNNs 506A-1 through 506A-N may be trained for each of the different orientations of silhouettes 504-1 through 504-N. Alternatively, one CNN may be trained to determine features from any orientation silhouette.

In implementations that utilize multiple images of the body 503 to produce multiple sets of features, such as the example illustrated in FIG. 5A, those features may be concatenated and the concatenated features processed together with a CNN to generate a set of personalized body features 507. For example, a CNN may be trained to receive features generated from different silhouettes 504 to produce personalized body features 507. The personalized body features 507 may indicate any aspect or information related to the body 503 represented in the images 502. For example, the personalized body features 507 may indicate 3D joint locations, body volume, shape of the body, pose angles, neural network weights corresponding to the body, etc. In some implementations, the concatenated CNN 506B may be trained to predict hundreds of personalized body features 507 corresponding to the body 503 represented in the images 502.

Utilizing the personalized body features 507, a body dimensions CNN 570 processes the features and determines body dimensions 572 for the body, as discussed further below. Likewise, a personalized 3D body model of the body is generated based on the personalized body features 507. For example, the personalized body features 507 may be provided to a body model, such as the SCAPE body model, the SMPL body model, etc., and the body model may generate the personalized 3D body model of the body 503 represented in the images 502 based on those personalized body features 507.

In the illustrated example, personalized 3D model refinement 508 may be performed to refine or revise the generated personalized 3D body model to better represent the body 503 represented in the 2D body images 502. For example, the personalized 3D body model may be compared to the body 503 represented in one or more of the 2D body images 502 to determine differences between the shape of the body 503 represented in the 2D body image 502 and the shape of the personalized 3D body model generated from the body features. In some implementations, the personalized 3D body model may be compared to a single image, such as image 502-1. In other implementations, the personalized 3D body model may be compared to each of the 2D body images 502-1 through 502-N in parallel or sequentially. In still other implementations, one or more 2D model images may be generated from the personalized 3D body model and those 2D model images may be compared to the silhouettes and/or the 2D body images to determine differences between the 2D model images and the silhouette/2D body images.

Comparing the personalized 3D body model and/or a 2D model image with a 2D body image 502 or silhouette 504 may include determining an approximate pose of the body 503 represented in the 2D body image and adjusting the personalized 3D body model to the approximate pose. The personalized 3D body model or rendered 2D model image may then be overlaid or otherwise compared to the body 503 represented in the 2D body image 502 and/or represented in the silhouette 504 to determine a difference between the personalized 3D body model and the 2D body image.

Based on the determined differences between the personalized 3D body model and the body 503 represented in the 2D body image 502, the silhouette 504 generated from that image may be refined to account for those differences. For example, if the personalized 3D body model is compared with the body 503 represented in the first image 502-1 and differences are determined, the silhouette 504-1 may be refined based on those differences. Alternatively, the body features and/or the personalized 3D body model may be refined to account for those differences.

If a silhouette is refined as part of the personalized 3D model refinement 508, the refined silhouette may be processed to determine refined features for the body 503 represented in the 2D body image based on the refined silhouette. The refined features may then be concatenated with the features generated from the other silhouettes or with refined features generated from other refined silhouettes that were produced by the personalized 3D model refinement 508. For example, the personalized 3D model refinement 508 may compare the generated personalized 3D body model with the body 503 as represented in two or more 2D body images 502, such as a front image 502-1 and a back image 502-3, differences determined for each of those images, refined silhouettes generated from those differences and refined front view features and refined back view features generated. Those refined features may then be concatenated with the two side view features to produce refined body model features. In other implementations, personalized 3D model refinement 508 may compare the personalized 3D body model with all views of the body 503 represented in the 2D body images 502 to determine differences and generate refined silhouettes for each of those 2D body images 502-1 through 502-N. Those refined silhouettes may then be processed by the CNNs 506A-1 through 506A-N to produce refined features and those refined features concatenated to produce refined body features 507. Finally, the refined body features 507 may be processed by personalized 3D modeling 510 to generate a refined personalized 3D body model. This process of personalized 3D refinement may continue until there is no or limited difference (e.g., below a threshold difference) between the generated personalized 3D body model and the body 503 represented in the 2D body images 502.

In another implementation, personalized 3D model refinement 508 may sequentially compare the personalized 3D body model with representations of the body 503 in the different 2D body images 502. For example, personalized 3D model refinement 508 may compare the personalized 3D body model with a first representation of the body 503 in a first 2D body image 502-1 to determine differences that are then used to generate a refined silhouette 504-1 corresponding to that first 2D body image 502-1. The refined silhouette may then be processed to produce refined features and those refined features may be concatenated 506B with the features generated from the other silhouettes 504-2 through 504-N to generate refined body features, which may be used to generate a refined personalized 3D body model. The refined personalized 3D body model may then be compared with a next image of the plurality of 2D body images 502 to determine any differences and the process repeated. This process of personalized 3D refinement may continue until there is no or limited difference (e.g., below a threshold difference) between the generated personalized 3D body model and the body 503 represented in the 2D body images 502.

In some implementations, upon completion of personalized 3D model refinement 508, the personalized 3D body model of the body represented in the 2D body images 502 may be augmented with one or more textures, texture augmentation 512, determined from one or more of the 2D body images 502-1 through 502-N. For example, the personalized 3D body model may be augmented to have a same or similar color to a skin color of the body 503 represented the 2D body images 502, clothing or clothing colors represented in the 2D body images 502 may be used to augment the personalized 3D body model, facial features, hair, hair color, etc., of the body 503 represented in the 2D body image 502 may be determined and used to augment the personalized 3D body model.

Similar to personalized 3D model refinement, the approximate pose of the body in one of the 2D body images 502 may be determined and the personalized 3D body model adjusted accordingly so that the texture obtained from that 2D body image 502 may be aligned and used to augment that portion of the personalized 3D body model. In some implementations, alignment of the personalized 3D body model with the approximate pose of the body 503 may be performed for each 2D body image 502-1 through 502-N so that texture information or data from the different views of the body 503 represented in the different 2D body images 502 may be used to augment the different poses of the resulting personalized 3D body model.

The result of the processing illustrated in the transition 500 is a personalized 3D body model 514 or avatar representative of the body of the user, that has been generated from 2D body images 502 of the body 503 of the user. In addition, determined body dimensions 572 may be presented with the personalized 3D body model, as illustrated above.

Figure 5B:
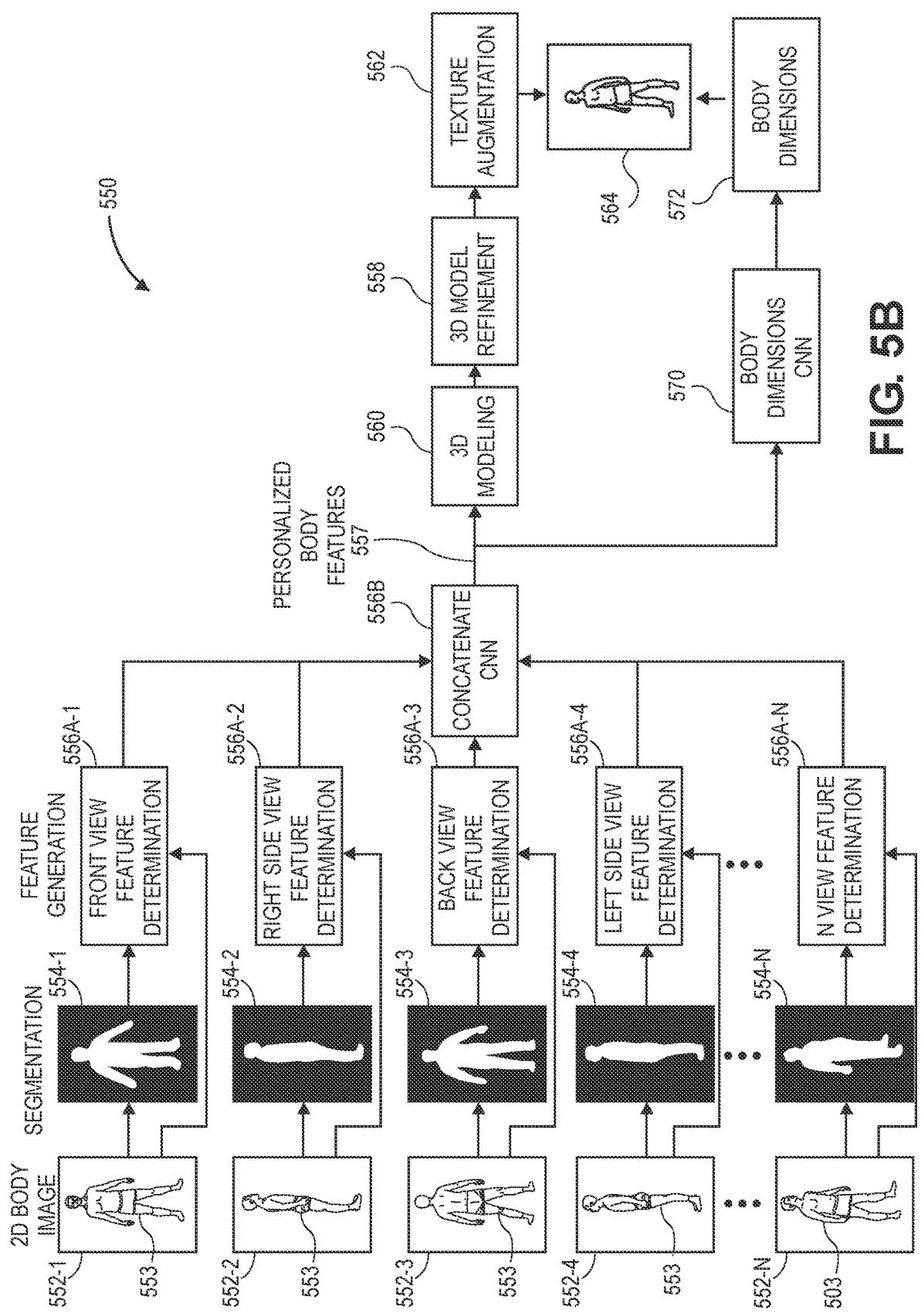
FIG. 5B is another transition diagram of processing two-dimensional body images to produce a personalized three-dimensional model of that body and corresponding body dimensions, in accordance with implementations of the present disclosure.

FIG. 5B is another transition diagram 550 of processing 2D body images 552 of a body to produce a personalized three-dimensional model of that body, in accordance with implementations of the present disclosure.

In some implementations, multiple 2D body images of a body from different views (e.g., front view, side view, back view, three-quarter view, etc.), such as 2D body images 552-1, 552-2, 552-3, 552-4 through 552-N may be utilized with the disclosed implementations to generate a personalized 3D body model of the body. In the illustrated example, the first 2D body image 552-1 is an image of a human body 553 oriented in a front view facing a 2D imaging element. The second 2D body image 552-2 is an image of the human body 553 oriented in a first side view facing the 2D imaging element. The third 2D body image 552-3 is an image of the human body 553 oriented in a back view facing the 2D imaging element. The fourth 2D body image 552-4 is an image of the human body 553 oriented in a second side view facing the 2D imaging element. As will be appreciated, any number of 2D body images 552-1 through 552-N may be generated with the view of the human body 553 in any number or orientations with respect to the 2D imaging element.

Each of the 2D body images 552-1 through 552-N are processed to segment pixels of the image that represent the human body from pixels of the image that do not represent the human body to produce a silhouette 554 of the human body as represented in that image. Segmentation may be done through, for example, background subtraction, semantic segmentation, etc. In one example, a baseline image of the background may be known and used to subtract out pixels of the image that correspond to pixels of the baseline image, thereby leaving only foreground pixels that represent the human body. The background pixels may be assigned RGB color values for black (i.e., 0, 0, 0). The remaining pixels may be assigned RGB values for white (i.e., 255, 255, 255) to produce the silhouette 554 or binary segmentation of the human body.

In another example, a CNN utilizing a semantic segmentation algorithm may be trained using images of human bodies, or simulated human bodies to train the CNN to distinguish between pixels that represent human bodies and pixels that do not represent human bodies. In such an example, the CNN may process the image 552 and indicate or label pixels that represent the body (foreground) and pixels that do not represent the body (background). The background pixels may be assigned RGB color values for black (i.e., 0, 0, 0). The remaining pixels may be assigned RGB values for white (i.e., 255, 255, 255) to produce the silhouette or binary segmentation of the human body.

In other implementations, other forms or algorithms, such as edge detection, shape detection, etc., may be used to determine pixels of the image 552 that represent the body and pixels of the image 552 that do not represent the body and a silhouette 554 of the body produced therefrom.

Returning to FIG. 5B, the first 2D body image 552-1 is processed to segment a plurality of pixels of the first 2D body image 552-1 that represent the human body from a plurality of pixels of the first 2D body image 552-1 that do not represent the human body, to produce a front silhouette 554-1 of the human body. The second 2D body image 552-2 is processed to segment a plurality of pixels of the second 2D body image 552-2 that represent the human body from a plurality of pixels of the second 2D body image 552-2 that do not represent the human body, to produce a first side silhouette 554-2 of the human body. The third 2D body image 552-3 is processed to segment a plurality of pixels of the third 2D body image 552-3 that represent the human body from a plurality of pixels of the third 2D body image 552-3 that do not represent the human body, to produce a back silhouette 554-3 of the human body. The fourth 2D body image 552-4 is processed to segment a plurality of pixels of the fourth 2D body image 552-4 that represent the human body from a plurality of pixels of the fourth 2D body image 552-4 that do not represent the human body, to produce a second side silhouette 554-4 of the human body. Processing of the 2D body images 552-1 through 552-N to produce silhouettes 554-1 through 554-N from different orientations of the human body 553 may be performed for any number of images 552.

As discussed above with respect to FIG. 4, in some implementations, the silhouette may be segmented into different body segments by processing the pixels of the 2D image to determine a likelihood that the pixel corresponds to a segment label (e.g., hair, upper clothing, lower clothing, head, upper right arm, upper left leg, etc.).

Similar to FIG. 5A, in some implementations, in addition to generating a silhouette 554 from the 2D body image, the silhouette may be normalized in size and centered in the image.

Each silhouette 554 representative of the body may then be processed to determine body traits or features of the human body. For example, different CNNs may be trained using silhouettes of bodies, such as human bodies, from different orientations with known features. In some implementations, different CNNs may be trained for different orientations. For example, a first CNN 556A-1 may be trained to determine front view features from front view silhouettes 554-1. A second CNN 556A-2 may be trained to determine right side features from right side silhouettes 554-2. A third CNN 556A-3 may be trained to determine back view features from back view silhouettes 554-3. A fourth CNN 556A-4 may be trained to determine left side features from left side silhouettes 554-4. Different CNNs 556A-1 through 556A-N may be trained for each of the different orientations of silhouettes 554-1 through 554-N. Alternatively, one CNN may be trained to determine features from any orientation silhouette.

In some implementations, the same or different CNNs may also utilize the 2D body image 502 as an input to the CNN that is used to generate and determine the body features. For example, the first CNN 556A-1 may be trained to determine front view features based on inputs of the front view silhouettes 554-1 and/or the 2D body image 552-1. The second CNN 556A-2 may be trained to determine right side features from right side silhouettes 554-2 and/or the right side 2D body image 552-2. The third CNN 556A-3 may be trained to determine back view features from back view silhouettes 554-3 and/or the back view 2D body image 552-3. The fourth CNN 556A-4 may be trained to determine left side features from left side silhouettes 554-4 and/or the left side 2D body image 552-4. Different CNNs 556A-1 through 556A-N may be trained for each of the different orientations of silhouettes 554-1 through 554-N and/or 2D body images 502-1 through 502-N.

In still other implementations, different CNNs may be trained for each of the silhouettes 554 and the 2D body images. For example, the first CNN 556A-1 may be trained to determine front view features from the silhouette 554-1 and another front view CNN may be trained to determine front view features from the 2D body image 552-1. The second CNN 556A-2 may be trained to determine right side view features from the silhouette 554-2 and another right side view CNN may be trained to determine right side view features from the 2D body image 552-2. The third CNN 556A-3 may be trained to determine back view features from the silhouette 554-3 and another back view CNN may be trained to determine back view features from the 2D body image 552-3. The fourth CNN 556A-4 may be trained to determine left side view features from the silhouette 554-4 and another left side view CNN may be trained to determine left side view features from the 2D body image 552-4.

In implementations that utilize multiple images of the body 553 and/or multiple silhouettes to produce multiple sets of features, such as the example illustrated in FIG. 5B, those features may be concatenated CNN 556B and the concatenated features processed together with a CNN to generate a set of personalized body features 557. For example, a CNN may be trained to receive features generated from different silhouettes 554, features generated from different 2D body images 552, and/or features generated by a CNN that processes both silhouettes 554 and the 2D body images 552 to produce personalized body features 557. The personalized body features 557 may indicate any aspect or information related to the body 553 represented in the images 552. For example, the personalized body features 557 may indicate 3D joint locations, body volume, shape of the body, pose angles, neural network weights corresponding to the body, etc. In some implementations, the concatenated CNN 556B may be trained to predict hundreds of personalized body features 557 corresponding to the body 553 represented in the images 552.

Utilizing the personalized body features 557, a body dimensions CNN 570 processes the features and determines body dimensions 572 for the body, as discussed further below. Likewise, a personalized 3D body model of the body is generated based on the personalized body features 557. For example, the personalized body features 557 may be provided to a body model, such as the SCAPE body model, the SMPL body model, etc., and the body model may generate the personalized 3D body model of the body 553 represented in the images 552 based on those personalized body features 557.

In the illustrated example, personalized 3D model refinement 558 may be performed to refine or revise the generated personalized 3D body model to better represent the body 553 represented in the 2D body images 552. For example, as discussed above, the personalized 3D body model may be compared to the body 553 represented in one or more of the 2D body images to determine differences between the shape of the body 553 represented in the 2D body image 552 and the shape of the personalized 3D body model generated from the body features. In some implementations, the personalized 3D body model may be compared to a single image, such as image 552-1. In other implementations, the personalized 3D body model may be compared to each of the 2D body images 552-1 through 552-N in parallel or sequentially. In still other implementations, one or more 2D model images may be generated from the personalized 3D body model and those 2D model images may be compared to the silhouettes and/or the 2D body images to determine differences between the 2D model images and the silhouette/2D body images.

Comparing the personalized 3D body model and/or a 2D model image with a 2D body image 552 or silhouette 554 may include determining an approximate pose of the body 553 represented in the 2D body image and adjusting the personalized 3D body model to the approximate pose. The personalized 3D body model or rendered 2D model image may then be overlaid or otherwise compared to the body 553 represented in the 2D body image 552 and/or represented in the silhouette 554 to determine a difference between the personalized 3D body model image and the 2D body image/silhouette.

Based on the determined differences between the personalized 3D body model and the body 553 represented in the 2D body image 552, the silhouette 554 generated from that image may be refined to account for those differences. Alternatively, the body features and/or the personalized 3D body model may be refined to account for those differences.

In some implementations, upon completion of personalized 3D model refinement 558, the personalized 3D body model of the body represented in the 2D body images 552 may be augmented with one or more textures, texture augmentation 562, determined from one or more of the 2D body images 552-1 through 552-N. For example, the personalized 3D body model may be augmented to have a same or similar color to a skin color of the body 553 represented the 2D body images 552, clothing or clothing colors represented in the 2D body images 552 may be used to augment the personalized 3D body model, facial features, hair, hair color, etc., of the body 553 represented in the 2D body image 552 may be determined and used to augment the personalized 3D body model.

Similar to personalized 3D model refinement, the approximate pose of the body in one of the 2D body images 552 may be determined and the personalized 3D body model adjusted accordingly so that the texture obtained from that 2D body image 552 may be aligned and used to augment that portion of the personalized 3D body model. In some implementations, alignment of the personalized 3D body model with the approximate pose of the body 553 may be performed for each 2D body image 552-1 through 552-N so that texture information or data from the different views of the body 553 represented in the different 2D body images 552 may be used to augment the different poses of the resulting personalized 3D body model.

The result of the processing illustrated in the transition 550 is a personalized 3D body model 564 or avatar representative of the body of the user, that has been generated from 2D body images 552 of the body 553 of the user. In addition, determined body dimensions 572 may be presented with the personalized 3D body model, as illustrated above.

As discussed above, features or objects expressed in imaging data, such as human bodies, colors, textures or outlines of the features or objects, may be extracted from the data in any number of ways. For example, colors of pixels, or of groups of pixels, in a digital image may be determined and quantified according to one or more standards, e.g., the RGB color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in images may be identified using one or more algorithms or machine-learning tools. The objects or portions of objects may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; semantic segmentation algorithms; background subtraction; or any other algorithms or techniques that may be known to those of ordinary skill in the pertinent arts.

Image processing algorithms, other machine learning algorithms or CNNs may be operated on computer devices of various sizes or types, including but not limited to smartphones or other cell phones, tablets, video cameras or other computer-based machines. Such mobile devices may have limited available computer resources, e.g., network bandwidth, storage capacity or processing power, as compared to larger or more complex computer devices. Therefore, executing computer vision algorithms, other machine learning algorithms, or CNNs on such devices may occupy all or much of the available resources, without any guarantee, or even a reasonable assurance, that the execution of such algorithms will be successful. For example, processing digital 2D body images captured by a user of a portable device (e.g., smartphone, tablet, laptop, webcam) according to one or more algorithms in order to produce a personalized 3D body model from the digital images may be an ineffective use of the limited resources that are available on the smartphone or tablet. Accordingly, in some implementations, as discussed herein, some or all of the processing may be performed by one or more computing resources that are remote from the portable device. In some implementations, initial processing of the images to generate binary segmented silhouettes may be performed on the device. Subsequent processing to generate and refine the personalized 3D body model may be performed on one or more remote computing resources. For example, the silhouettes may be sent from the portable device to the remote computing resources for further processing. Still further, in some implementations, texture augmentation of the personalized 3D body model of the body may be performed on the portable device or remotely.

In some implementations, to increase privacy of the user, only the binary segmented silhouette may be sent from the device for processing on the remote computing resources and the original 2D images that include the representation of the user may be maintained locally on the portable device. In such an example, the rendered personalized 3D body model and body dimensions may be sent back to the device and the device may perform texture augmentation of the received personalized 3D body model based on those images. Utilizing such a distributed computing arrangement retains user identifiable information on the portable device of the user while at the same time leveraging the increased computing capacity available at remote computing resources.

Machine learning tools, such as artificial neural networks, have been utilized to identify relations between respective elements of apparently unrelated sets of data. An artificial neural network, such as CNN, is a parallel distributed computing processor comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses have been utilized in image processing applications.

Artificial neural networks may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive one or more inputs and generate one or more outputs in accordance with an activation or energy function, with features corresponding to the various strengths or synaptic weights. Likewise, each of the neurons within a network may be understood to have different activation or energy functions; in this regard, such a network may be dubbed a heterogeneous neural network. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or −1 to +1. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information specifically flows in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize the error in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

Once a neural network has been trained to recognize dominant characteristics of an input of a training set, e.g., to associate an image with a label, a category, a cluster or a pseudolabel thereof, to within an acceptable tolerance, an input and/or multiple inputs, in the form of an image, silhouette, features, known traits corresponding to the image, etc., may be provided to the trained network, and an output generated therefrom. For example, the CNN discussed above may receive as inputs a generated silhouette and one or more body attributes (e.g., height, weight, gender) corresponding to the body represented by the silhouette. The trained CNN may then produce as outputs the predicted features corresponding to those inputs.

Figure 6:
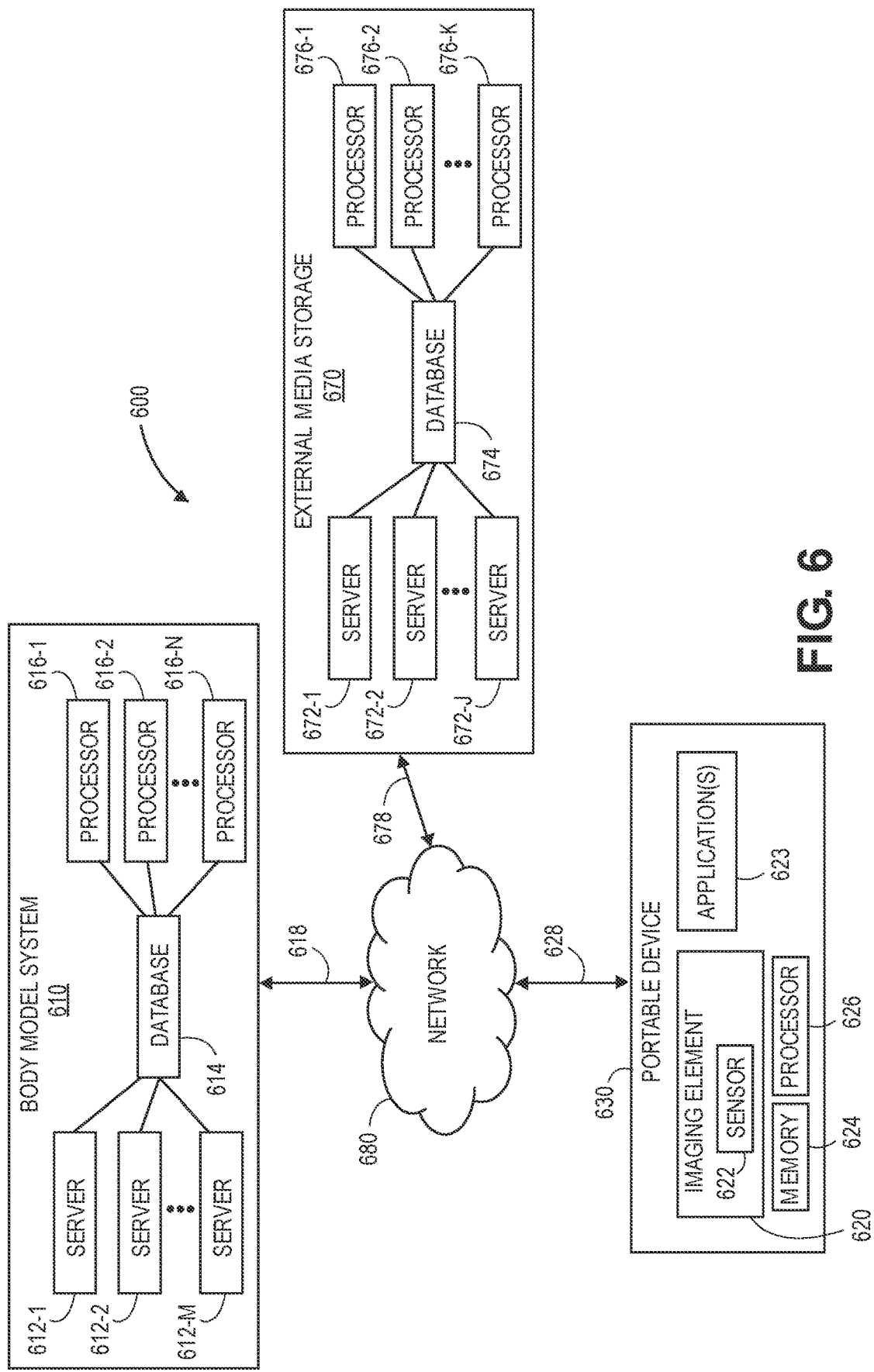
FIG. 6 is a block diagram of components of an image processing system, in accordance with implementations of the present disclosure.

Referring to FIG. 6, a block diagram of components of one image processing system 600 in accordance with implementations of the present disclosure is shown.

The system 600 of FIG. 6 includes a body model system 610, an imaging element 620 that is part of a portable device 630 of a user, such as a tablet, a laptop, a cellular phone, a webcam, etc., and an external media storage facility 670 connected to one another across a network 680, such as the Internet.

The body model system 610 of FIG. 6 includes M physical computer servers 612-1, 612-2 . . . 612-M having one or more databases (or data stores) 614 associated therewith, as well as N computer processors 616-1, 616-2 . . . 616-N provided for any specific or general purpose. For example, the body model system 610 of FIG. 6 may be independently provided for the exclusive purpose of generating personalized 3D body models, body dimensions, and/or body measurements from 2D body images captured by imaging elements, such as imaging element 620, or silhouettes produced therefrom, or alternatively, provided in connection with one or more physical or virtual services configured to manage or monitor such information, as well as one or more other functions. The servers 612-1, 612-2 . . . 612-M may be connected to or otherwise communicate with the databases 614 and the processors 616-1, 616-2 . . . 616-N. The databases 614 may store any type of information or data, including simulated silhouettes, body features, simulated 3D body models, etc. The servers 612-1, 612-2 . . . 612-M and/or the computer processors 616-1, 616-2 . . . 616-N may also connect to or otherwise communicate with the network 680, as indicated by line 618, through the sending and receiving of digital data.

The imaging element 620 may comprise any form of optical recording sensor or device that may be used to photograph or otherwise record information or data regarding a body of the user, or for any other purpose. As is shown in FIG. 6, the portable device 630 that includes the imaging element 620 is connected to the network 680 and includes one or more sensors 622, one or more memory or storage components 624 (e.g., a database or another data store), one or more processors 626, and any other components that may be required in order to capture, analyze and/or store imaging data, such as the 2D body images discussed herein. For example, the imaging element 620 may capture one or more still or moving images and may also connect to or otherwise communicate with the network 680, as indicated by the line 628, through the sending and receiving of digital data. Although the system 600 shown in FIG. 6 includes just one imaging element 620 therein, any number or type of imaging elements, portable devices, or sensors may be provided within any number of environments in accordance with the present disclosure.

The portable device 630 may be used in any location and any environment to generate 2D body images that represent a body of the user. In some implementations, the portable device may be positioned such that it is stationary and approximately vertical (within approximately ten-degrees of vertical) and the user may position their body within a field of view of the imaging element 620 of the portable device at different orientations so that the imaging element 620 of the portable device may generate 2D body images that include a representation of the body of the user from different orientations.

The portable device 630 may also include one or more applications 623 stored in memory that may be executed by the processor 626 of the portable device to cause the processor of the portable device to perform various functions or actions. For example, when executed, the application 623 may provide instructions to a user regarding placement of the portable device, positioning of the body of the user within the field of view of the imaging element 620 of the portable device, orientation of the body of the user, etc. Likewise, in some implementations, the application may present a personalized 3D body model, body dimensions, and/or body measurements determined and generated from the 2D body images in accordance with the described implementations, to the user and allow the user to interact with the personalized 3D body model. For example, a user may rotate the personalized 3D body model to view different angles of the personalized 3D body model, view accurate body dimensions determined from the 2D images, view body measurements, such as body fat, body mass, body volume, etc. Likewise, in some implementations, the personalized 3D body model may be modified by request of the user to simulate what the body of the user may look like under certain conditions, such as loss of weight, gain of muscle, etc.

The external media storage facility 670 may be any facility, station or location having the ability or capacity to receive and store information or data, such as silhouettes, simulated or rendered personalized 3D body models of bodies, textures, body dimensions, etc., received from the body model system 610, and/or from the portable device 630. As is shown in FIG. 6, the external media storage facility 670 includes J physical computer servers 672-1, 672-2 . . . 672-J having one or more databases 674 associated therewith, as well as K computer processors 676-1, 676-2 . . . 676-K. The servers 672-1, 672-2 . . . 672-J may be connected to or otherwise communicate with the databases 674 and the processors 676-1, 676-2 . . . 676-K. The databases 674 may store any type of information or data, including digital images, silhouettes, personalized 3D body models, etc. The servers 672-1, 672-2 . . . 672-J and/or the computer processors 676-1, 676-2 . . . 676-K may also connect to or otherwise communicate with the network 680, as indicated by line 678, through the sending and receiving of digital data.

The network 680 may be any wired network, wireless network, or combination thereof, and may comprise the Internet in whole or in part. In addition, the network 680 may be a personal area network, local area network, wide area network, cable network, satellite network, cellular telephone network, or combination thereof. The network 680 may also be a publicly accessible network of linked networks, possibly operated by various distinct parties, such as the Internet. In some implementations, the network 680 may be a private or semi-private network, such as a corporate or university intranet. The network 680 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The body model system 610, the portable device 630 or the external media storage facility 670 may use any web-enabled or Internet applications or features, or any other client-server applications or features including E-mail or other messaging techniques, to connect to the network 680, or to communicate with one another, such as through short or multimedia messaging service (SMS or MMS) text messages. For example, the servers 612-1, 612-2 . . . 612-M may be adapted to transmit information or data in the form of synchronous or asynchronous messages from the body model system 610 to the processor 626 or other components of the portable device 630, or any other computer device in real time or in near-real time, or in one or more offline processes, via the network 680. Those of ordinary skill in the pertinent art would recognize that the body model system 610, the portable device 630 or the external media storage facility 670 may operate any of a number of computing devices that are capable of communicating over the network, including but not limited to set-top boxes, personal digital assistants, digital media players, web pads, laptop computers, desktop computers, electronic book readers, cellular phones, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 612-1, 612-2 . . . 612-M, the processor 626, the servers 672-1, 672-2 . . . 672-J, or any other computers or control systems utilized by the body model system 610, the portable device 630, applications 623, or the external media storage facility 670, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer-readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 7:
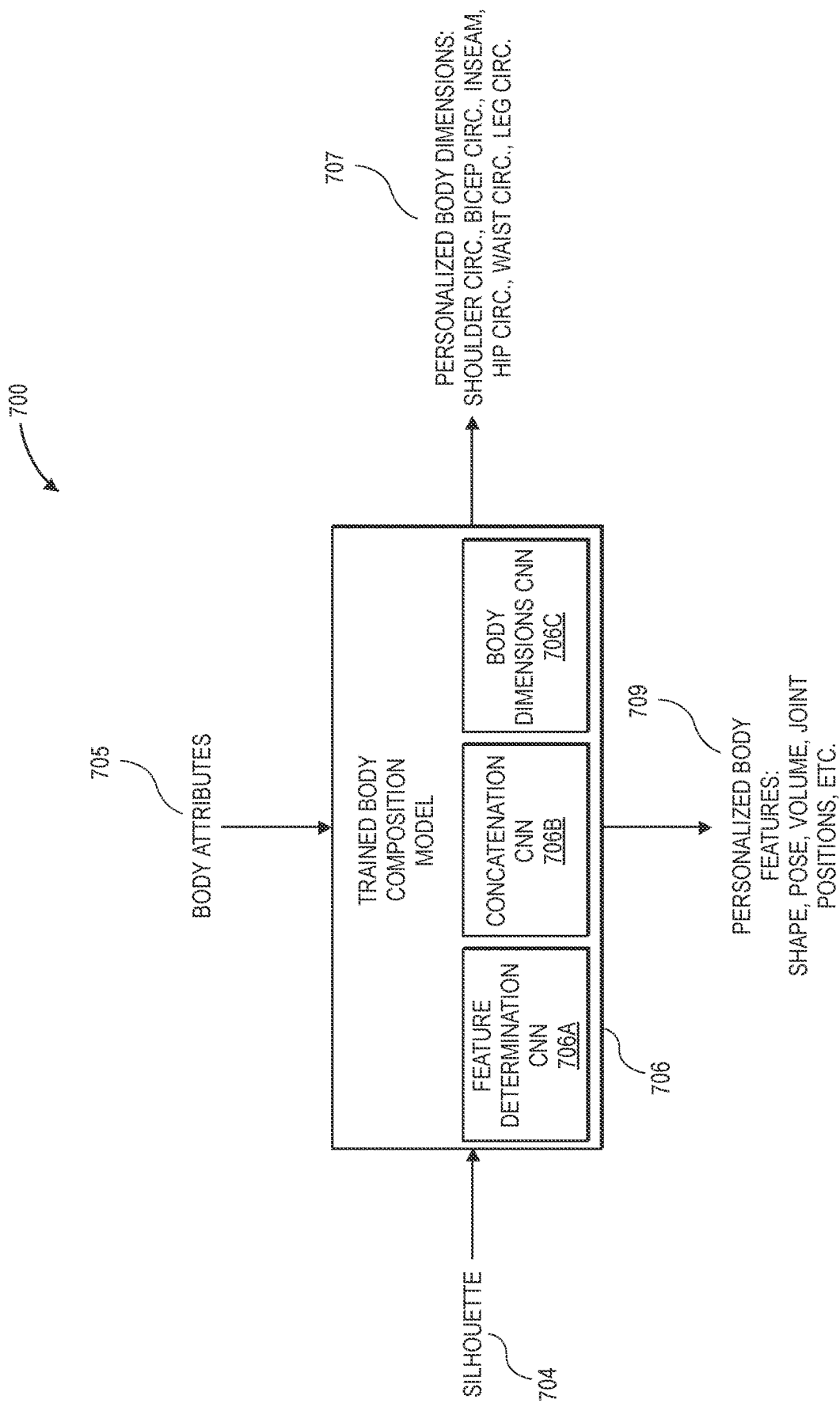
FIG. 7 is a block diagram of a trained body composition model that determines body dimensions of a body represented in two-dimensional body images, in accordance with implementations of the present disclosure.

FIG. 7 is a block diagram of a trained body composition model 700 that determines body features 709 and body dimensions 707 of a body represented in two-dimensional images, in accordance with implementations of the present disclosure. As discussed above, the model 700 may be a neural network, such as a CNN that is trained to receive one or more inputs that are processed to generate one or more outputs, such as the body features 709 and body dimensions 707. In the illustrated example, the trained body composition model 706 may include several component CNNs that receive different inputs and provide different outputs. Likewise, outputs from one of the component CNNs may be provided as an input to one or more other component CNNs of the trained body composition model. For example, the trained body composition model may include three parts of component CNNs. In one implementation, a first component part may include one or more feature determination CNNs 706A and a second component part may include a concatenation CNN 706B. The third part may be a body dimensions CNN 706C. In the illustrated example, there may be different feature determination CNNs 706A for each of the different body orientations (e.g., front view, right side view, back view, left side view, three-quarter view), different silhouettes 704 corresponding to those different body orientations, and/or different 2D body images corresponding to those different body orientations, each CNN trained for inputs having the particular orientation. Likewise, in some implementations, the feature determination CNNs 706A may receive multiple different types of inputs. For example, in addition to receiving a silhouette 704 and/or 2D body image, each feature determination CNN 706A may receive one or more body attributes 705 corresponding to the body represented by the silhouettes 704 and/or 2D body images. The body attributes 705 may include, but are not limited to, height, weight, gender, etc. As discussed, the trained feature determination CNNs 706A may process the inputs and generate features representative of the bodies represented in the 2D body images that were used to produce the silhouettes 704. For example, if there are four silhouettes, one for a front view, one or a right side view, one for a back view, and one for a left side view, the four feature determination CNNs 706A trained for those views each produce a set of features representative of the body represented in the 2D body image used to generate the silhouette.

Utilizing binary silhouettes 704 of bodies improves the accuracy of the feature determination CNN 706A as it can focus purely on size, shape, etc. of the body, devoid of any other aspects (e.g., color, clothing, hair, etc.). In other implementations, the use of the 2D body images in conjunction with or independent of the silhouettes provides additional data, such as shadows, skin tone, etc., that the feature determination CNN 706A may utilize in determining and producing a set of features representative of the body represented in the 2D body image.

The features output from the feature determination CNNs 706A, in the disclosed implementation, are received as inputs to the concatenation CNN 706B. Likewise, in some implementations, the concatenation CNN 706B may be trained to receive other inputs, such as body attributes 705.

As discussed, the concatenation CNN 706B may be trained to receive the inputs of features, and optionally other inputs, produce concatenated features, and produce as outputs a set of body features 709 corresponding to the body represented in the 2D body images. In some implementations, the body features may include hundreds of features, including, but not limited to, shape, pose, volume, joint position, etc., of the represented body.

The body dimensions CNN 706C, which may be trained using real and/or synthetic data, as discussed further below, may receive as inputs the outputs from the concatenation CNN 706B, and optionally other inputs, and process those inputs to determine one or more body dimensions 707 for the body represented in the input silhouette 704.

Figure 8:
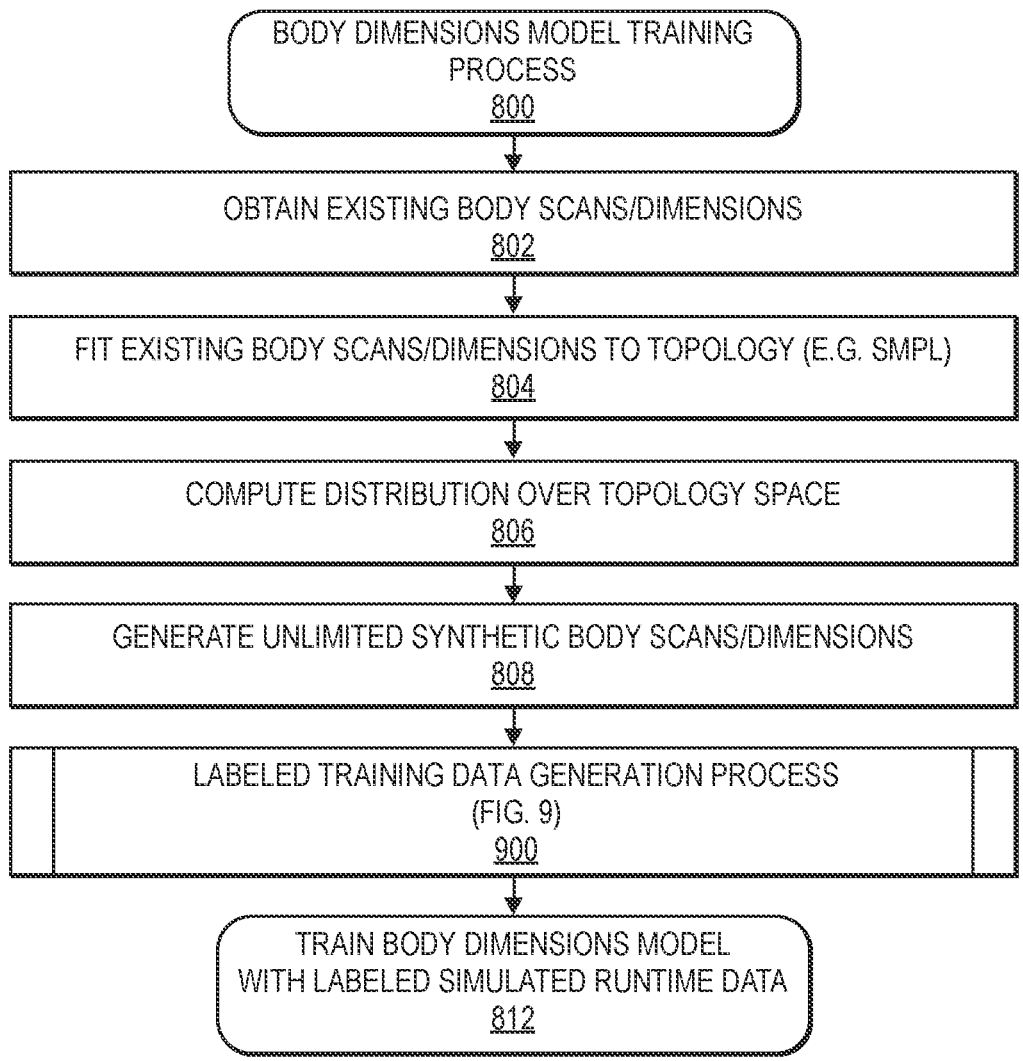
FIG. 8 is an example body dimensions model training process, in accordance with implementations of the present disclosure.

FIG. 8 is an example body dimensions model training process 800, in accordance with implementations of the present disclosure. The example process 800 may be used to generate labeled simulated data that is used to train a neural network, such as a CNN, to determine body dimensions from a silhouette of a body, such as a human body, as discussed herein.

The example process 800 begins by obtaining existing body scans/dimensions of a group of bodies, as in 802. Existing body scans may include, but are not limited to, body scans provided by users, public databases of body dimensions and corresponding 3D body scans, etc. In general, the only requirement for the existing body scans and dimensions be that the body scan be a 3D body scan and the dimensions include some or all of the dimensions for which the body dimension model is to be trained. In some implementations, the existing body scan/dimensions may be a limited set of data, such as 5,000-10,000 existing body scans/dimensions of different bodies of different dimensions.

The existing body scans/dimensions may then be fit to a topology, such as SMPL model, or other similar topology, as in 804. Using the topology and the different body dimensions corresponding to the different body scans, the example process 800 computes a distribution of any number of derivative body scans and corresponding body dimensions across the topology space, as in 806. For example, the body scans/dimensions may be integrated between two existing body scans/dimensions to compute essentially an infinite number of additional bodies and corresponding dimensions between those two existing body scans and corresponding body dimensions.

Utilizing the computed distribution, an unlimited number of synthetic 3D body models and corresponding body dimensions may then be generated, as in 808. For example, the initial set of 5,000-10,000 existing body scans and corresponding body models may be expanded to include hundreds of thousands, millions, or more 3D body models and corresponding body dimensions of varying sizes and shapes for which the body dimensions and synthetic body model are known.

The synthetic 3D body model and corresponding body dimensions may then be used to generate labeled simulated body data using the labeled training data generation process 900, as discussed further below with respect to FIG. 9. The result of the labeled training data generation process 900 (FIG. 9) is labeled simulated body data. As discussed below, the labeled simulated body data includes silhouettes generated from the synthetic 3D body models and the corresponding body dimensions for that synthetic 3D body model. In other implementations, the labeled simulated body data includes body features representative of the synthetic 3D body model, as determined from one or more silhouettes of that synthetic 3D body model.

Utilizing the labeled simulated body data, the body dimensions model may be trained to determine body dimensions from one or more silhouettes generated from a 2D body image and/or from personalized body features generated from one or more 2D body images of a body, as discussed herein, as in 812. Training of the body dimension model may be performed using supervised learning and the labeled simulated body data as the training inputs.

Figure 9:
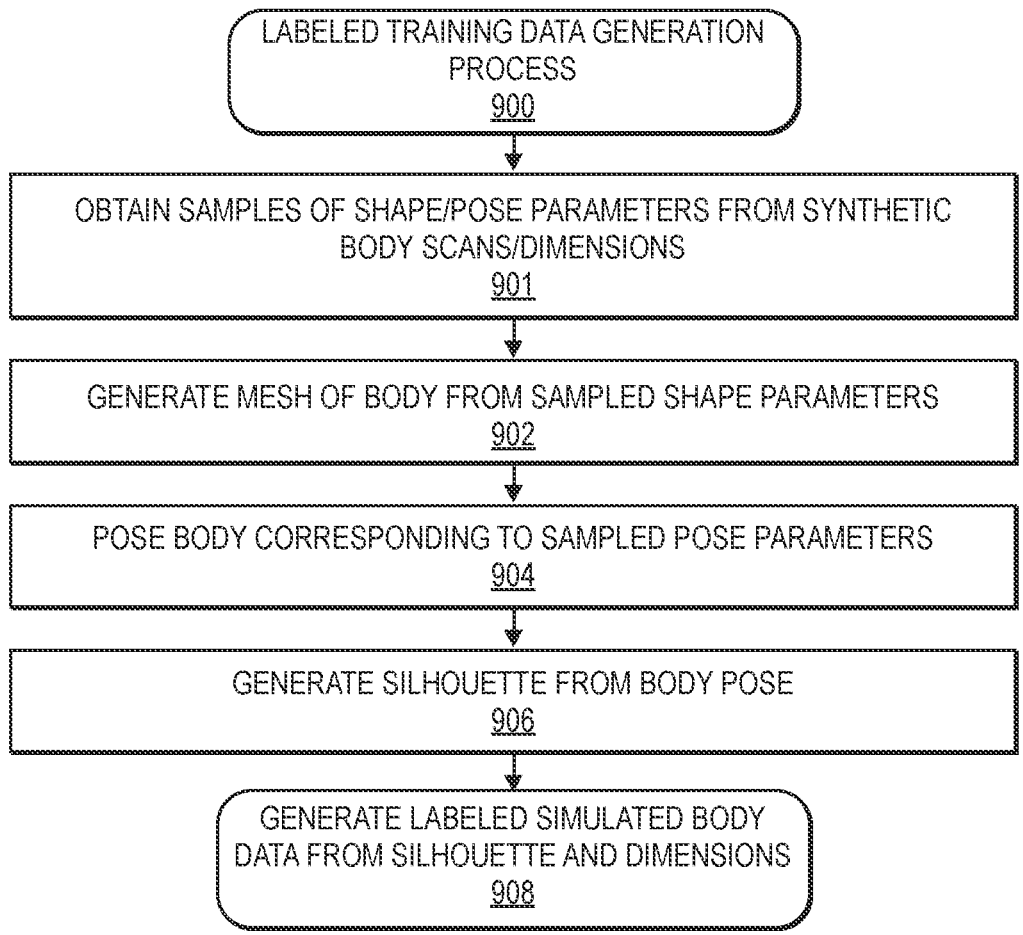
FIG. 9 is an example labeled training data generation process, in accordance with implementations of the present disclosure.

FIG. 9 is an example labeled training data generation process 900, in accordance with implementations of the present disclosure.

The example process 900 begins by obtaining samples of the shape/pose parameters from synthetic body scans and corresponding body dimensions, as in 901. A mesh of a body may then be generated for each sampled shape parameters, as in 902. Generating a mesh of a body may be performed using any of a variety of 3D modeling techniques or engines. For example, any one or more of Blender, OpenGL, Neural Mesh Render, etc., may be used to generate a mesh of a body.

Each mesh of a body may then be positioned to correspond to the obtained sampled pose parameters, as in 904. In some implementations, the position of the mesh may also be varied slightly between body meshes and/or positioned in a defined pose, such as an A pose. For example the orientation, rotation, distance, amount of leg and/or arm separation, etc., may be varied between meshes of bodies, thereby increasing the realistic aspect of the synthetic data.

For each posed mesh of a body, one or more silhouettes are generated, as in 906. For example multiple silhouettes may be generated from the posed mesh of the body, each silhouette from different orientations (e.g., front view, right side view, back view, left side view, etc.). Generation of a silhouette from a posed mesh of a body may be performed in a manner similar to the discussion above for generating a silhouette from a 2D body image. For example, a 2D representation of the posed mesh of the body may be generated, thereby indicative of a 2D body image of a body, and then the 2D representation utilized to generate a silhouette of the posed mesh of the body. In other implementations, the silhouette(s) of the 3D mesh may be determined directly from the posed mesh of the body. In some implementations, body features representative of the posed mesh of the body may be generated from the silhouette(s), as discussed above.

Finally, the silhouette(s) and/or body features determined from the silhouette(s) for each synthetic body may be combined with the body dimensions generated for that synthetic body to generate labeled simulated body data, as in 908.

Figure 10:
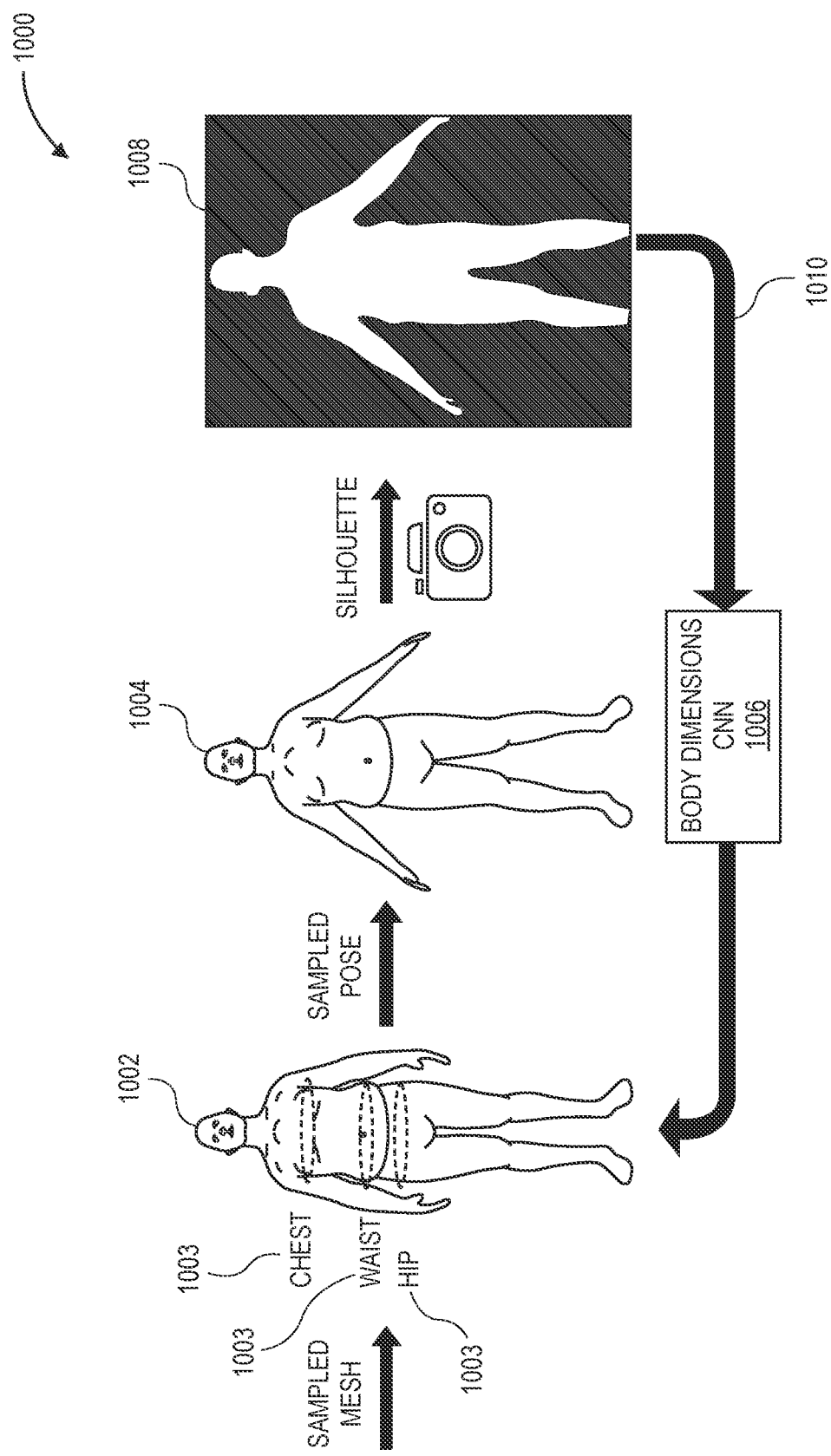
FIG. 10 is illustrative of an example training of a body dimension model using synthetically generated labeled training data, in accordance with implementations of the present disclosure.

FIG. 10 is illustrative of an example training 1000 of a body dimension model 1006 using synthetically generated labeled training data, in accordance with implementations of the present disclosure.

As illustrated, synthetic data is used to generate a mesh of a body 1002 and the body dimensions 1003, such as the chest circumference, waist circumference, hip circumference, etc., are known from the simulated data. The mesh of the body is then positioned in a defined pose, such as an A pose 1004. As discussed above the pose may vary slightly for different meshes of different bodies of the simulated data. One or more silhouettes 1008 are then generated from the pose 1004 of the mesh of the body, thereby representing input data 1010 that will typically be received by the body dimension model 1006 once trained. Finally, the silhouette and corresponding body dimensions, which are the labels of the training data for training of the body dimension model 1006 are used to train the body dimension model so that it can accurately determine body dimensions from silhouettes of bodies represented in 2D images, as discussed herein.

As noted above, in some implementations, multiple silhouettes may be generated from each pose 1004 of the mesh of the body and provided as inputs to train the body dimension model 1006. In still other examples, body features may be generated from the one or more silhouettes generated for the posed mesh of the body and those body features and corresponding body dimensions provided as inputs to the body dimension model 1006 to train the body dimension model.

Figure 11:
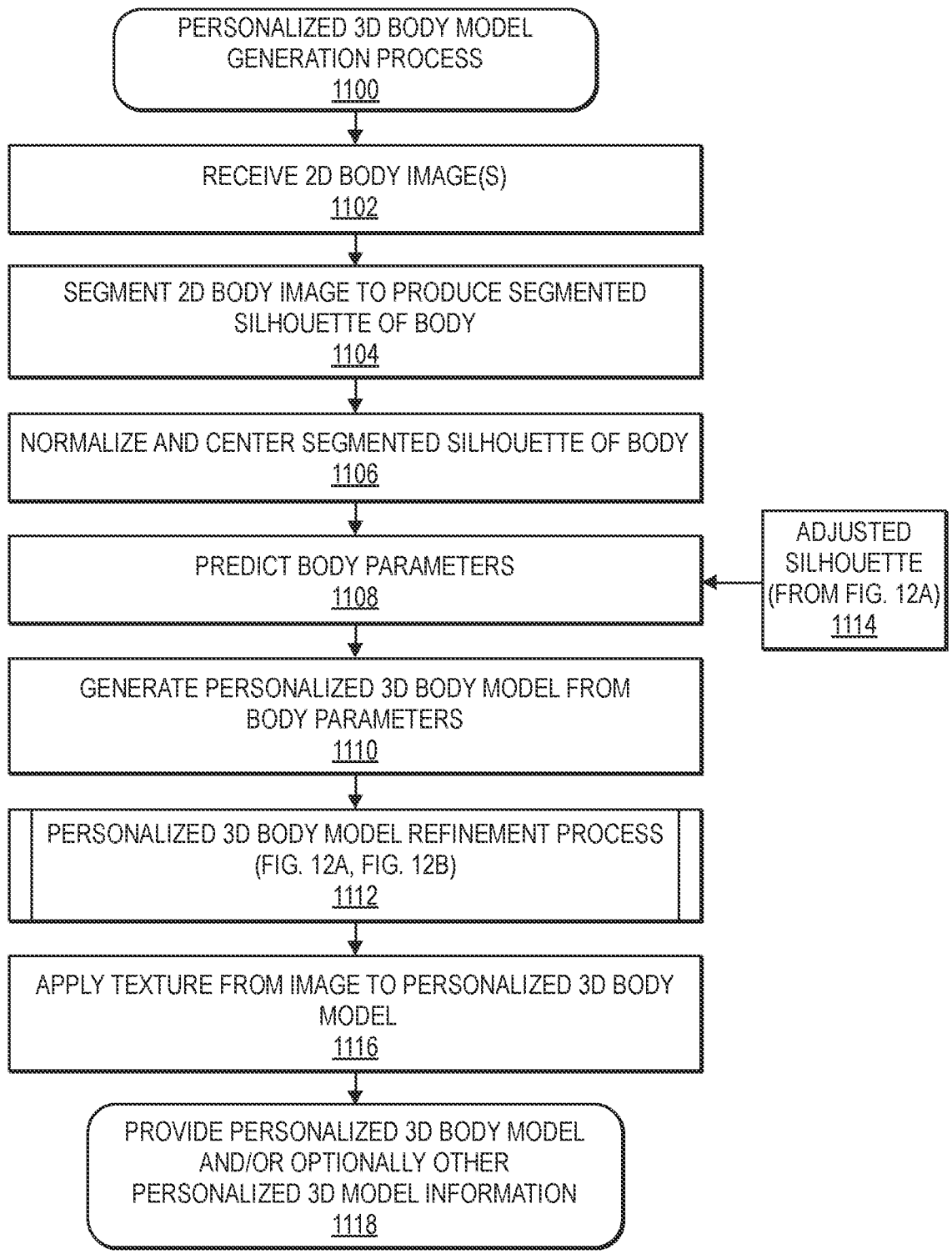
FIG. 11 is an example flow diagram of a three-dimensional body model generation process, in accordance with implementations of the present disclosure.

FIG. 11 is an example flow diagram of a personalized 3D body model generation process 1100, in accordance with implementations of the present disclosure.

The example process 1100 begins upon receipt of one or more 2D body images of a body, as in 1102. As noted above, the disclosed implementations are operable with any number of 2D body images for use in generating a personalized 3D body model of that body. For example, in some implementations, a single 2D body image may be used. In other implementations, two, three, four, or more 2D body images may be used.

As discussed above, the 2D body images may be generated using any 2D imaging element, such as a camera on a portable device, a webcam, etc. The received 2D body images are then segmented to produce a binary silhouette of the body represented in the one or more 2D body images, as in 1104. As discussed above, one or more segmentation techniques, such as background subtraction, semantic segmentation, Canny edge detectors or algorithms, Sobel operators, algorithms or filters, Kayyali operators, Roberts edge detection algorithms, Prewitt operators, Frei-Chen methods, or any other algorithms or techniques that may be known to those of ordinary skill in the pertinent arts. In some implementations, the silhouette may be further segmented into body segments.

In addition, in some implementations, the silhouettes may be normalized in height and centered in the image before further processing, as in 1106. For example, the silhouettes may be normalized to a standard height based on a function of a known or provided height of the body of the user represented in the image and an average height (e.g., average height of female body, average height of male body). In some implementations, the average height may be more specific than just gender. For example, the average height may be the average height of a gender and a race corresponding to the body, or a gender and a location (e.g., United States) of the user, etc.

The normalized and centered silhouette may then be processed by one or more neural networks, such as one or more CNNs as discussed above, to generate body parameters representative of the body represented in the 2D body images, as in 1108. As discussed above, there may be multiple steps involved in body parameter prediction. For example, each silhouette may be processed using CNNs trained for the respective orientation of the silhouette to generate sets of features of the body as determined from the silhouette. The sets of features generated from the different silhouette may then be processed using a neural network, such as a CNN, to concatenate the features and generate the body parameters representative of the body represented in the 2D body images.

The body parameters may then be provided to one or more body models, such as an SMPL body model or a SCAPE body model and the body model may generate a personalized 3D body model for the body represented in the 2D body images, as in 1110. In addition, in some implementations, the personalized 3D body model may be refined, if necessary, to more closely correspond to the actual image of the body of the user, as in 1200. Personalized 3D body model refinement is discussed above, and discussed further below with respect FIGS. 12A and 12B.

As discussed below, the personalized 3D body model refinement process 1200 (FIG. 12A) returns a refined silhouette, as in 1114. Upon receipt of the refined silhouette, the example process 1100 again generates body parameters, as in 1108, and continues. This may be done until no further refinements are to be made to the silhouette. In comparison, the personalized 3D body model refinement process 1250 (FIG. 12B) generates and returns a refined personalized 3D body model and the example process 1100 continues at block 1116.

Figure 12A:
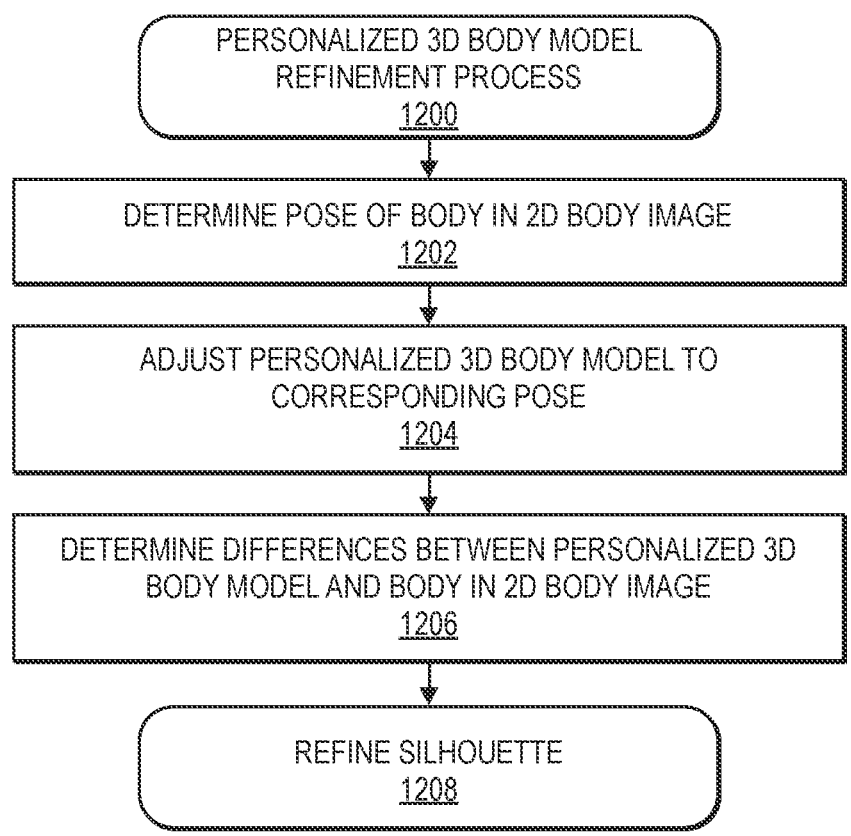
FIG. 12A is an example flow diagram of a three-dimensional body model refinement process, in accordance with implementations of the present disclosure.
Figure 12B:
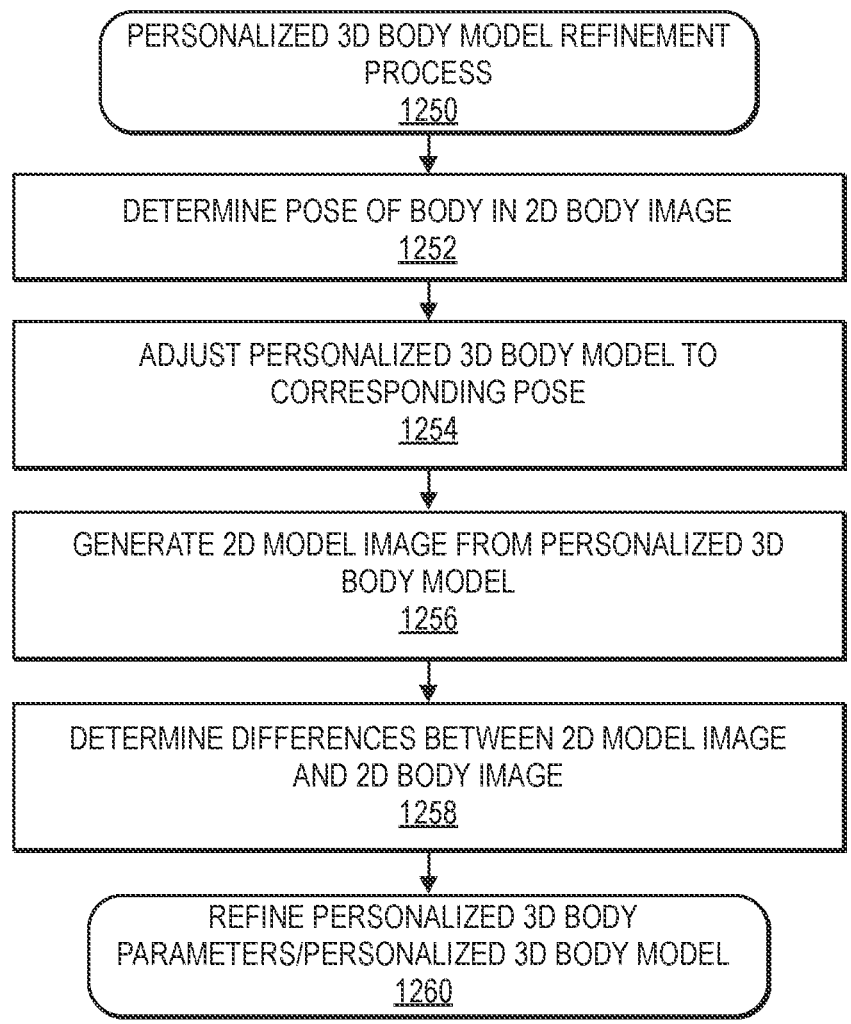
FIG. 12B is another example flow diagram of a three-dimensional body model refinement process, in accordance with implementations of the present disclosure.

After refinement of the silhouette and generation of a personalized 3D body model from refined body parameters, or after receipt of the refined personalized 3D body model from FIG. 12B, one or more textures (e.g., skin tone, hair, clothing, etc.) from the 2D body images may be applied to the personalized 3D body model, as in 1116. Finally, the personalized 3D body model may be provided to the user as representative of the body of the user and/or other personalized 3D body model information (e.g., body mass, joint locations, arm length, body fat percentage, etc.) may be determined from the model, as in 1118.

FIG. 12A is an example flow diagram of a personalized 3D body model refinement process 1200, in accordance with implementations of the present disclosure. The example process 1200 begins by determining a pose of a body represented in one of the 2D body images, as in 1202. A variety of techniques may be used to determine the approximate pose of the body represented in a 2D body image. For example, camera parameters (e.g., camera type, focal length, shutter speed, aperture, etc.) included in the metadata of the 2D body image may be obtained and/or additional camera parameters may be determined and used to estimate the approximate pose of the body represented in the 2D body image. For example, a personalized 3D body model may be used to approximate the pose of the body in the 2D body image and then a position of a virtual camera with respect to that model that would produce the 2D body image of the body may be determined. Based on the determined position of the virtual camera, the height and angle of the camera used to generate the 2D body image may be inferred. In some implementations, the camera tilt may be included in the metadata and/or provided by a portable device that includes the camera. For example, many portable devices include an accelerometer and information from the accelerometer at the time the 2D body image was generated may be provided as the tilt of the camera. Based on the received and/or determined camera parameters, the pose of the body represented in the 2D body image with respect to the camera may be determined, as in 1202.

The personalized 3D body model of the body of the user may then be adjusted to correspond to the determined pose of the body in the 2D body image, as in 1204. With the personalized 3D body model adjusted to approximately the same pose as the user represented in the image, the shape of the personalized 3D body model may be compared to the shape of the body in the 2D body image and/or the silhouette to determine any differences between the personalized 3D body model and the representation of the body in the 2D body image and/or silhouette, as in 1206.

In some implementations, it may be determined whether any determined difference is above a minimum threshold (e.g., 2%). If it is determined that there is a difference between the personalized 3D body model and the body represented in one or more of the 2D body images, the silhouette may be refined. The silhouette may then be used to generate refined body parameters for the body represented in the 2D body images, as discussed above with respect to FIG. 11. If the silhouette is refined, the refined silhouette is returned to the example process 1100, as discussed above and as illustrated in block 1114 (FIG. 11). If no difference is determined or if it is determined that the difference does not exceed a minimum threshold, an indication may be returned to the example process 1100 that there are no differences between the personalized 3D body model and the 2D body image/silhouette.

FIG. 12B is an example flow diagram of another personalized 3D body model refinement process 1250, in accordance with implementations of the present disclosure. The example process 1250 begins by determining a pose of a body represented in one of the 2D body images, as in 1252. A variety of techniques may be used to determine the approximate pose of the body represented in a 2D body image. For example, camera parameters (e.g., camera type, focal length, shutter speed, aperture, etc.) included in the metadata of the 2D body image may be obtained and/or additional camera parameters may be determined and used to estimate the approximate pose of the body represented in the 2D body image. For example, a personalized 3D body model may be used to approximate the pose of the body in the 2D body image and then a position of a virtual camera with respect to that model that would produce the 2D body image of the body may be determined. Based on the determined position of the virtual camera, the height and angle of the camera used to generate the 2D body image may be inferred. In some implementations, the camera tilt may be included in the metadata and/or provided by a portable device that includes the camera. For example, many portable devices include an accelerometer and information from the accelerometer at the time the 2D body image was generated may be provided as the tilt of the camera. Based on the received and/or determined camera parameters, the pose of the body represented in the 2D body image with respect to the camera may be determined, as in 1252.

The personalized 3D body model of the body of the user may then be adjusted to correspond to the determined pose of the body in the 2D body image, as in 1254. With the personalized 3D body model adjusted to approximately the same pose as the user represented in the image, a 2D model image from the personalized 3D body model is generated, as in 1256. The 2D model image may be generated, for example, by converting or imaging the personalized 3D body model into a 2D image with the determined pose, as if a digital 2D image of the personalized 3D body model had been generated. Likewise, the 2D model image may be a binary image with pixels corresponding to the model having a first set of values (e.g., white—RGB values of 255, 255, 255) and pixels that do not represent the model having a second set of values (e.g., black—RGB values of 0, 0, 0)

The 2D model image is then compared with the 2D body image and/or the silhouette to determine any differences between the 2D model image and the representation of the body in the 2D body image and/or silhouette, as in 1258. For example, the 2D model image may be aligned with the 2D body image and/or the silhouette and pixels between the images compared to determine differences between the pixel values. In implementations in which the pixels are binary (e.g., white or black) an error (e.g., % difference) may be determined as a difference in pixel values between the 2D model image and the 2D body image. That error is differentiable and may be utilized to adjust the body parameters and, as a result, the shape of the personalized 3D body model.

In some implementations, it may be determined whether any determined difference is above a minimum threshold (e.g., 2%). If it is determined that there is a difference between the 2D model image and the body represented in one or more of the 2D body images/silhouette, the personalized 3D body model and/or the body parameters may be refined to correspond to the shape and/or size of body represented in the 2D body image and/or the silhouette, as in 1260. This example process 1250 may continue until there is no difference between the 2D model image and the 2D body image/silhouette, or the difference is below a minimum threshold. As discussed above, the refined personalized 3D body model produced from the example process 1250, or if no refinements are necessary, the personalized 3D body model is returned to example process 1100 at block 1112 and the process 1100 continues.

Figure 13:
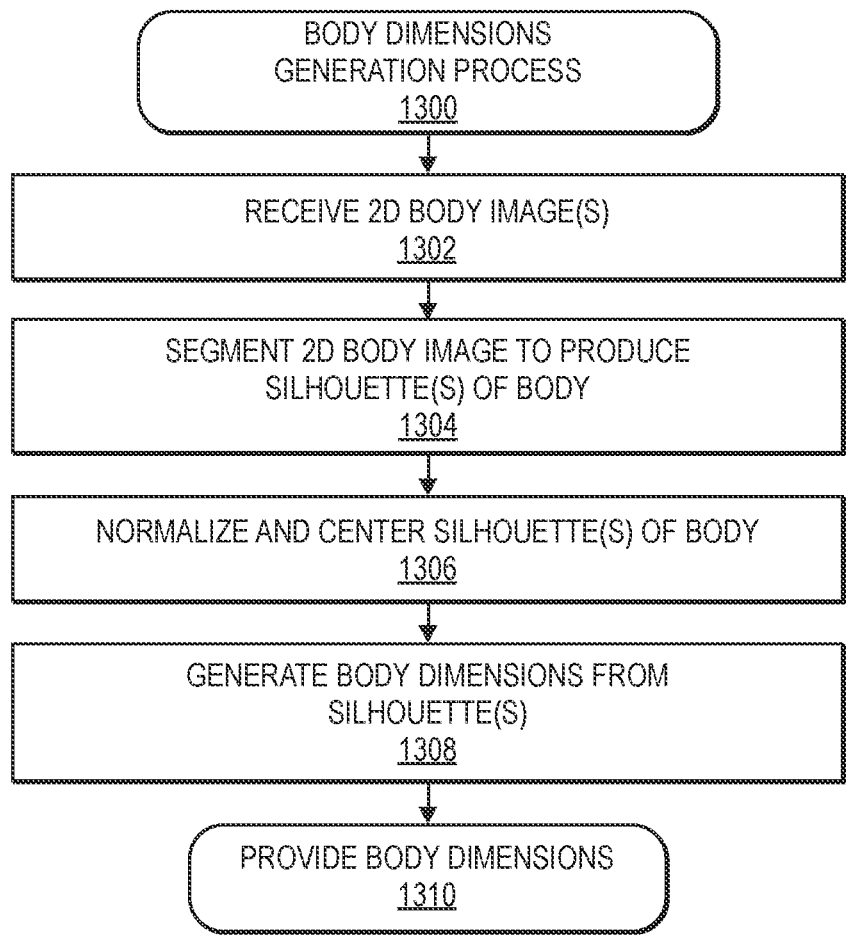
FIG. 13 is an example body dimensions generation process, in accordance with implementations of the present disclosure

FIG. 13 is an example body dimensions generation processes 1300, in accordance with disclosed implementations.

The example process 1300 begins upon receipt of one or more 2D body images of a body, as in 1302. As noted above, the disclosed implementations are operable with any number of 2D body images for use in generating body dimensions of the body represented in the image. For example, in some implementations, a single 2D body image may be used. In other implementations, two, three, four, or more 2D body images may be used.

As discussed above, the 2D body images may be generated using any 2D imaging element, such as a camera on a portable device, a webcam, etc. The received 2D body images are then segmented to produce a binary silhouette of the body represented in the one or more 2D body images, as in 1304. As discussed above, one or more segmentation techniques, such as background subtraction, semantic segmentation, Canny edge detectors or algorithms, Sobel operators, algorithms or filters, Kayyali operators, Roberts edge detection algorithms, Prewitt operators, Frei-Chen methods, or any other algorithms or techniques that may be known to those of ordinary skill in the pertinent arts. In some implementations, the silhouette may be further segmented into body segments.

In addition, in some implementations, the silhouette(s) may be normalized in height and centered in the image before further processing, as in 1306. For example, the silhouettes may be normalized to a standard height based on a function of a known or provided height of the body of the user represented in the image and an average height (e.g., average height of female body, average height of male body). In some implementations, the average height may be more specific than just gender. For example, the average height may be the average height of a gender and a race corresponding to the body, or a gender and a location (e.g., United States) of the user, etc.

The silhouette(s) of the body represented in the 2D image(s) may then be provided to a trained body dimension model, as discussed above, to generate body dimensions for the body represented in the 2D images, as in 1308. In some implementations, the silhouette(s) may be sent directly to the trained body dimension model for processing. In other implementations, as discussed above, the silhouettes, if there are more than one, may be concatenated and/or further processed to generate personalized body features representative of the body and corresponding silhouette. Those personalized body features may then be provided to the trained body dimension model and the body dimension model may generate body dimensions for the body represented in the 2D image(s) based on the received personalized body features.

Finally, the body dimensions determined by the trained body dimension model may be provided, as in 1310. In some implementations, the determined body dimensions may be included in a presentation along with a generated personalized 3D body model of the body, with other body measurements, etc. In other examples, the body dimensions may be used to group or classify the body into a cohort and/or to provide information regarding the body dimensions determined for the body compared to body dimensions of others in the same cohort, having a similar age, gender, etc.

Figure 14:
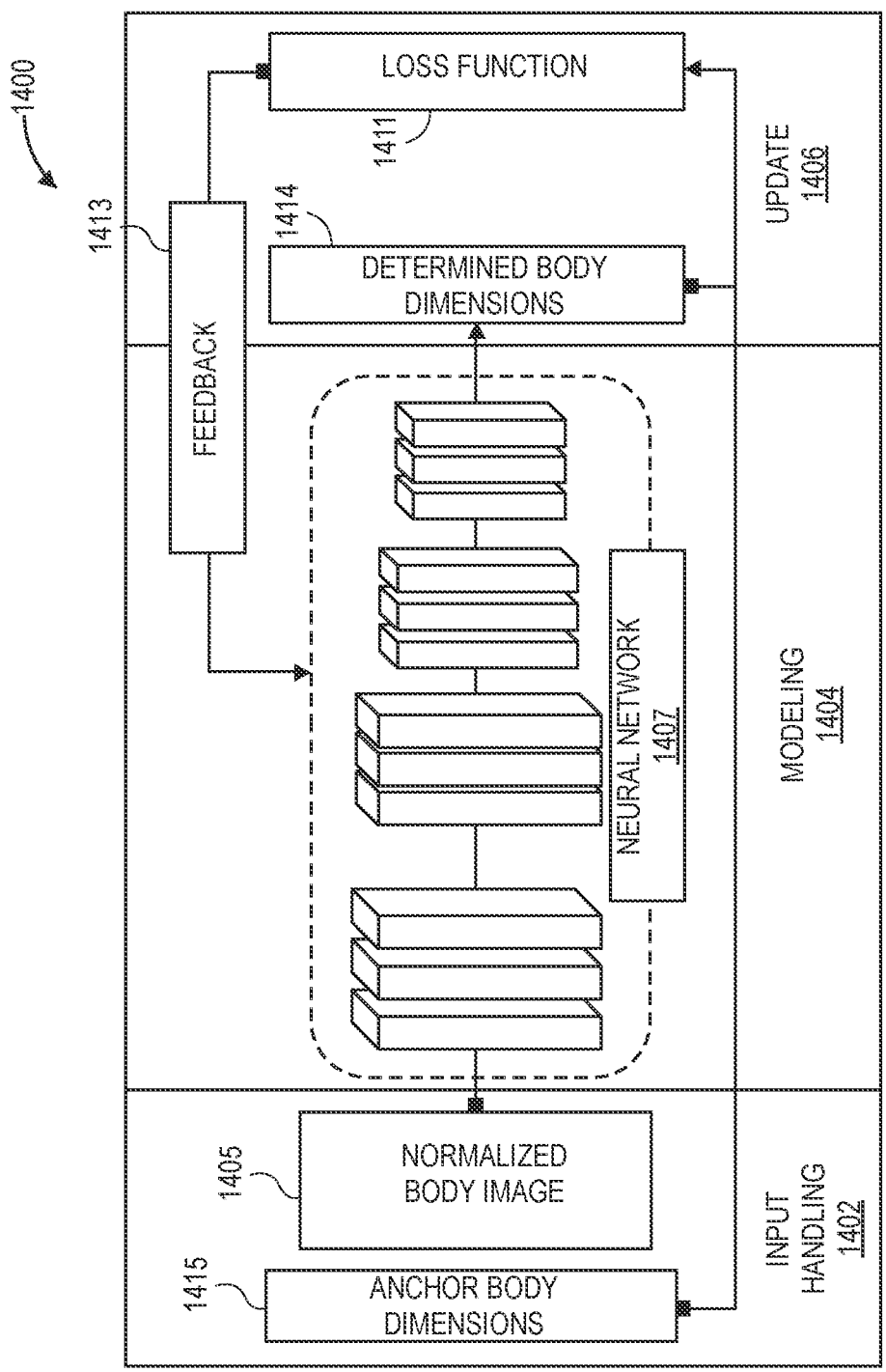
FIG. 14 is a block diagram of an example system operable to determine body fat measurements from a two-dimensional body image, in accordance with implementations of the present disclosure.

FIG. 14 is a block diagram of an example system 1400 operable to determine body dimensions 1414 from a 2D body image, in accordance with implementations of the present disclosure. As discussed above, the input 2D body image may include a representation of an entire body or a representation of a portion of the body (e.g., head, torso, leg, arm, head to knee, neck to knee, neck to torso, etc.). Likewise, while the discussions herein focus primarily on receiving and processing a 2D body image, the disclosed implementations may likewise be used with 2D video. In such an implementation, a frame from the video may be extracted and processed with the disclosed implementations to determine body dimensions for a body represented in the extracted frame.

Each component of the system 1400 may be performed as computer executable instructions executing on a computing device, such as the computing resources 103/203 (FIGS. 1A, 1B, 2) and/or the portable device 130/230 (FIGS. 1A, 1B, 2). In some implementations, all aspects of the system may execute on one set of computing resources, such as the computing resources 103/203 or the portable device 130/230. In other implementations, a first portion of the system 1400 may execute on one set of computing resources, such as the portable device 130/230 while a second portion of the system 1400 executes on a second set of computing resources, such as the computing resources 103/203.

Regardless of the source, the 2D body image is received by an input handling component 1402. The input handling component processes the received 2D body image and produces a normalized body image 1405. The normalized body image is of a defined size, such as 640×256 pixels by 3 channels (red, green, blue). Likewise, pixels that do not represent the body may be suppressed by setting their color values to a defined color, such as black (0,0,0). The normalized body image decreases the number of input variations into the remainder of the system 1400. In some implementations, the body image may be segmented into multiple body segments and pixels of each body segment may include an identifier associating the pixel with a respective body segment.

The normalized body image is then passed to a modeling component 1404 that may include one or more neural networks 1407. For example, the neural network 1407 may be a modified version of a residual network, such as ResNet-50. Residual learning, or a residual network, such as ResNet-50 utilizes several layers or bottlenecks that are stacked and trained to the task to be performed (such as image classification). The network learns several low/mid/high level features at the end of its layers. In residual learning, the neural network 1407 is trained to learn the residual of each bottleneck. A residual can be simply understood as a subtraction of the feature learned from input of that layer. Some residual networks, such as ResNet-50 do this by connecting the output of one bottleneck to the input of another bottleneck.

The disclosed implementations modify the residual network by extracting the features learned in each layer and concatenating those features with the output of the network to determine body dimensions 1414 of the body represented in the received 2D body image.

In addition to determining a body dimensions 1414 of the body represented in the 2D image, in some implementations, an update component 1406 may be used to determine one or more loss functions 1411 from the determined body dimensions and from anchor body dimensions 1415 (e.g., synthetically determined body dimensions and/or existing body dimensions) that are maintained by the system 1400. Anchor body dimensions, may be baseline or known body dimensions for different images, different body parts, body dimensions corresponding to different body shapes, muscle definitions, etc. The determined loss functions 1411 may be fed back into the modeling component 1404 and/or directly to the neural network 1407 as feedback 1413. The feedback may be used to improve the accuracy of the system 1400.

In some implementations, additional information may be received by the system 1400 and used as additional inputs to the system 1400. For example, additional information about the body, such as age, gender, ethnicity, height, weight, etc., may also be received as inputs and used by the neural network 1407 in determining body dimensions, as discussed herein.

Figure 15:
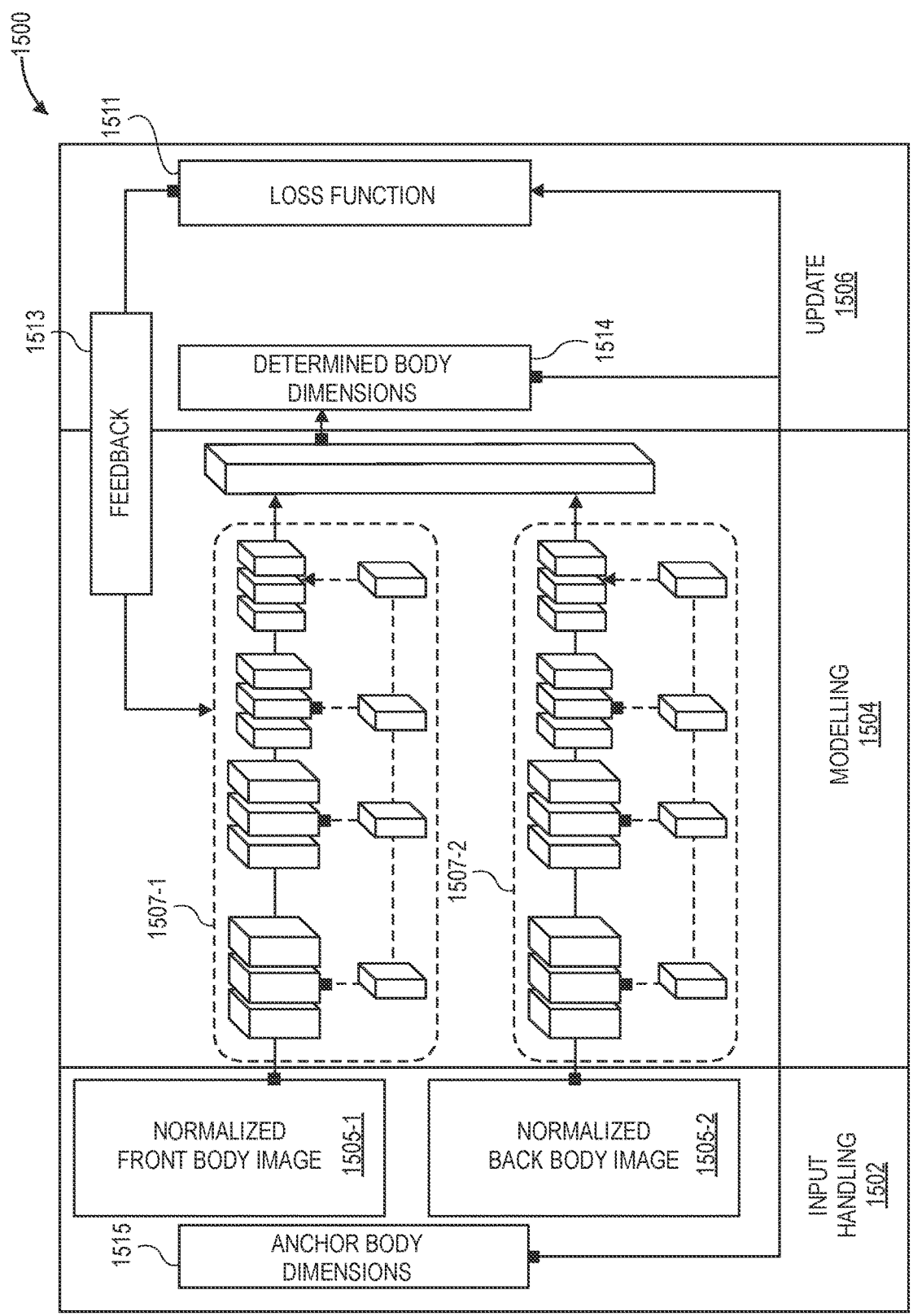
FIG. 15 is a block diagram of an example system operable to determine body fat measurements from multiple two-dimensional body images, in accordance with implementations of the present disclosure.

FIG. 15 is a block diagram of another example system 1500 operable to determine body dimensions from multiple 2D body images, in accordance with implementations of the present disclosure.

In the example illustrated in FIG. 15, multiple input images are received by the input handling component 1502 and each image is processed, as discussed herein, to generate respective normalized body images. For example, if a first image is a front side view image, the front side view image may be processed by the input handling component 1502 to produce a normalized front body image 1505-1. Likewise, if the second image is a back side view image, the back side view image may be processed by the input handling component 1502 to produce a normalized back body image 1505-2.

Each normalized body image 1505 is passed to the modeling component 1504 and processed by one or more neural networks, such as neural network 1507-1 or neural network 1507-2 to determine respective body dimensions of the body. The outputs of those processes may be combined to produce a single set of dimensions 1514 representative of the body represented in the input images.

In addition, the determined body dimensions may be processed by an update component 1506 along with anchor body measurements 1515 to determine one or more loss functions 1511 that are provided as feedback 1513 to the modeling component and/or the neural networks 1507 to improve the accuracy of the system 1500. In some implementations the final body dimensions 1514 may be processed by the update component 1506 to determine the loss functions. In other implementations, the determined body dimensions 1514 determined for each of the normalized body images may be individually processed by the update component 1506 and the respective loss function 1511 provided as feedback 1513 to the respective portion of the modeling component and/or the neural network that processed the normalized body image. For example, the update component 1506 may determine a first loss function 1511 based on the determined body dimensions 1514 generated by the neural network 1507-1 and provide first loss functions 1511 as first feedback 1513 to the neural network 1507-1. Likewise, the update component 1506 may also determine a second loss function 1511 based on the determined body dimensions 1514 generated by the neural network 1507-2 and provide the second loss functions 1511 as second feedback 1513 to the neural network 1507-2.

In still other examples, rather than utilizing a single neural network to process each received normalized input image, neural networks may be trained to process a combination of normalized input images to determine body dimensions. For example, if the combination of front side view body image and back side view body image is often received, a single neural network may be trained to process both normalized body images concurrently to determine body dimensions from the two images. In other implementations, other combinations of images, body directions in the images, or number of images may likewise be used to train a neural network for processing those images and determining body dimensions for the body represented in those images.

In some implementations, additional information may be received by the system 1500 and used as additional inputs to the system 1500. For example, additional information about the body, such as age, gender, ethnicity, height, weight, etc., may also be received as inputs and used by the neural networks 1507 in determining body dimensions, as discussed herein.

In some implementations, the system 1400/1500 may also produce other outputs in addition to the body dimensions. For example, in some implementations, the disclosed implementations may also produce information indicating body measurements (e.g., body fat, body mass index, weight, etc.) and/or age, gender, ethnicity, height, etc.

Figure 16:
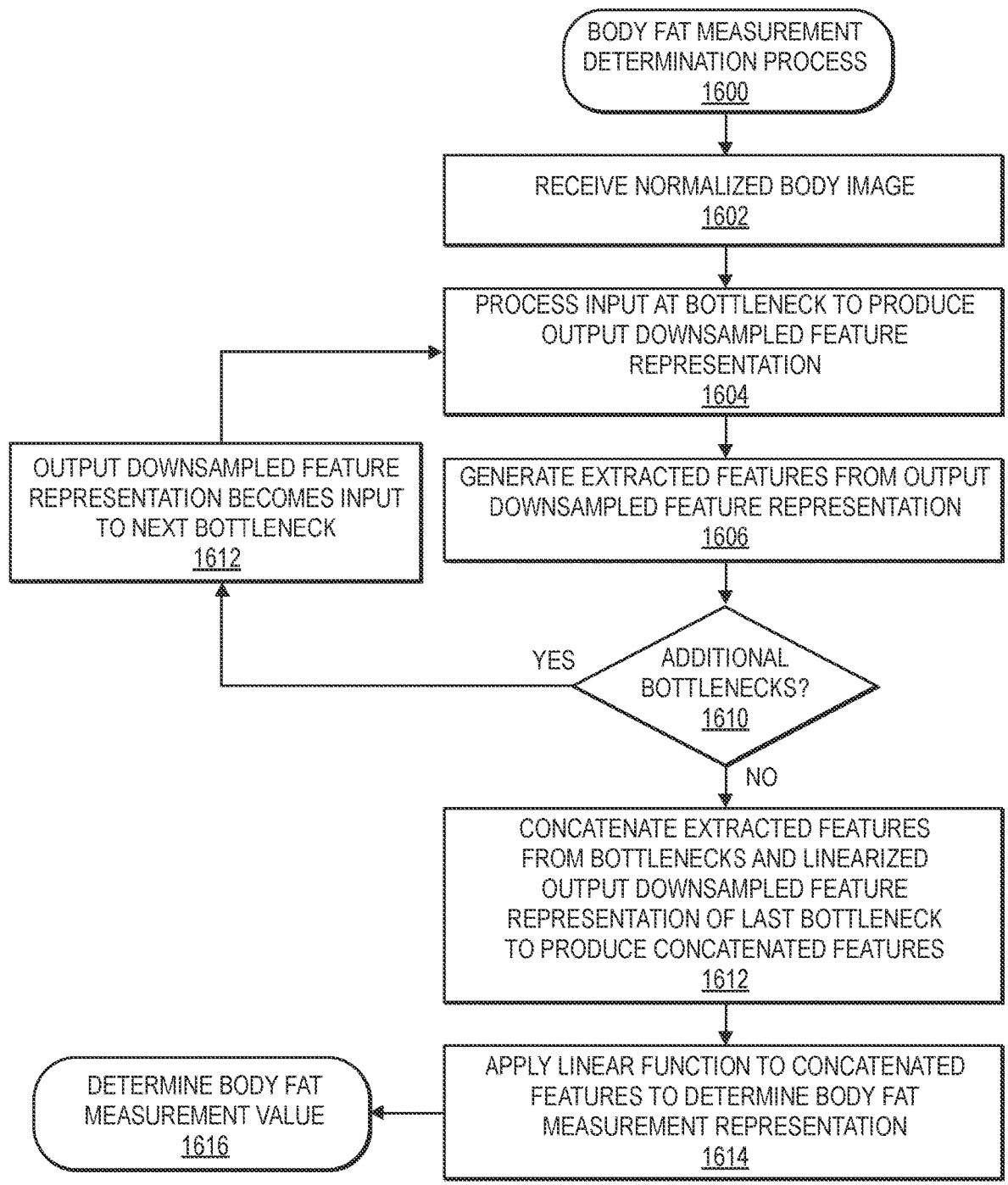
FIG. 16 is an example body fat measurement determination process, in accordance with implementations of the present disclosure.

FIG. 16 is an example body fat measurement determination process 1600, in accordance with implementations of the present disclosure.

The example process 1600 begins upon receipt of the normalized body image, as in 1602. The normalized body image may be, for example, produced from a 2D image as discussed above.

The normalized body image is processed as an input to a first bottleneck of the neural network and the first bottleneck outputs a downsampled feature representation, as in 1604. For example, a neural network may include multiple bottlenecks, such as five bottlenecks, each of which process an input and generate a downsampled feature representation as an output. Each bottleneck is a stack of deep-learning units, such as convolution layers, non-linear activation functions (Rectified Linear Units ("ReLU")), pooling operations (MaxPooling, Average Pooling) and batch normalization. Each bottleneck may reduce the spatial resolution of the input by a factor of two. In other implementations, the spatial resolution may be downsampled differently.

In this example, the first bottleneck receives the normalized body image as the input and reduces the spatial resolution of the normalized body image from 640×256, by a factor of two, down to 320×128. Likewise, in this example, the channels are increased to 64 channels. In other implementations, channel increase may be different based on, for example, computing capacity, computation time, etc. Accordingly, in this example, the output of the first bottleneck is a feature representation with a height of 320, a width of 128, and 64 channels.

The example process 1600 then generates extracted features from the downsampled feature representation, as in 1606. For example, the features from any one or more bottlenecks may be extracted by averaging the outputs of the bottleneck across the spatial dimensions. For example, if the features are extracted from the output of the first bottleneck, the 64 feature channels are averaged across the 320×128 spatial dimensions. In some implementations, features may not be extracted from all bottlenecks of the neural network. For example, features may not be extracted from the first output of the first bottleneck for use in determining the body fat measurement. In other examples, features may not be extracted from other bottlenecks of the neural network. In comparison, in some implementations, features may be extracted from all bottleneck outputs and utilized with the disclosed implementations.

As the features are extracted, a determination is made as to whether additional bottlenecks remain to be processed, as in 1610. If it is determined that additional bottlenecks remain, the downsampled feature representation from the upstream bottleneck is used as the input to the next bottleneck, as in 1612, and the process 1600 continues.

Continuing with the example of five bottlenecks, the first downsampled feature representation output from the first bottleneck may be provided as an input to the second bottleneck. The second bottleneck receives the first downsampled feature representation, which has spatial dimensions of 320×128, and 64 channels and processes that input to produce a second downsampled feature representation that has spatial dimensions of 160×64 and 256 channels. As the example process 1600 (FIG. 16) continues, the third bottleneck receives the second downsampled feature representation and processes that input to produce a third downsampled feature representation that has spatial dimensions of 80×32 and 512 channels. The fourth bottleneck receives the third downsampled feature representation and processes that input to produce a fourth downsampled feature representation that has spatial dimensions of 40×16 and 1024 channels. The fifth bottleneck receives the fourth downsampled feature representation and processes that input to produce a fifth downsampled feature representation that has spatial dimensions of 20×8 and 2048 channels.

As illustrated in the example process 1600, extracted features are generated from the output downsampled feature representations, as in 1606. For example and continuing with the above discussion, the 256 channels of the second downsampled feature representation may be averaged across the 160×64 spatial dimensions to get second extracted features $F_2 \in 256 \times 1$. The 512 channels of the third downsampled feature representation may be averaged across the 80×32 spatial dimensions to get third extracted features $F_3 \in 512 \times 1$. The 1024 channels of the fourth downsampled feature representation may be averaged across the 40×16 spatial dimensions to get fourth extracted features $F_4 \in 1024 \times 1$. The 2048 channels of the fifth downsampled feature representation may be averaged across the 20×8 spatial dimensions to get fifth extracted features $F_5 \in 2048 \times 1$.

If there are no additional bottlenecks to process, the example process 1600 utilizes a multi-scale representation which combines the extracted features from each of the downsampled inputs and concatenates them with a 1000-channel feature output from the neural network to produce concatenated features, as in 1612.

A linear function may then be applied to the concatenated features to determine a body fat measurement representation, as in 1614. For example, continuing with the above example, a linear function may be applied to the concatenated features to produce a determined body fat measurement representation which, in this example is a 65×1 dimensional vector.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Additionally, in accordance with the present disclosure, the training of machine learning tools (e.g., artificial neural networks or other classifiers) and the use of the trained machine learning tools to detect body pose, determine body point locations, determine body direction, determine body dimensions of the body, determine body measurements of the body, and/or to generate personalized 3D body models of a body based on one or more 2D body images of that body may occur on multiple, distributed computing devices, or on a single computing device, as described herein.

Likewise, while the above discussions focus primarily on a personalized 3D body model, body dimensions, and/or body measurements of a body being generated from multiple 2D body direction images, in some implementations, the personalized 3D body model, body dimensions, and/or body measurements may be generated based on a single 2D body direction image of the body. In other implementations, two or more 2D direction body images may be used with the disclosed implementations.

Still further, while the above implementations are described with respect to generating personalized 3D body models, body dimensions, and/or body measurements of human bodies represented in 2D body images, in other implementations, non-human bodies, such as dogs, cats, or other animals may be modeled in 3D, body dimensions, and/or body measurements determined based on 2D images of those bodies. Accordingly, the use of a human body in the disclosed implementations should not be considered limiting.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts illustrated and discussed herein, orders in which such methods or processes are presented are not intended to be construed as any limitation on the claimed inventions, and any number of the method or process steps or boxes described herein can be combined in any order and/or in parallel to implement the methods or processes described herein. Likewise, in some implementations, one or more steps or orders of the methods or processes may be omitted. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving a first two-dimensional ("2D") body image of a human body from a 2D camera;
   processing the first 2D body image to segment a first plurality of pixels of the first 2D body image that represent the human body from a second plurality of pixels of the first 2D body image that do not represent the human body to produce a first silhouette of the human body;
   processing the first silhouette using a convolutional neural network to produce a plurality of body dimensions corresponding to the human body;
   generating, based at least in part on the first silhouette or at least some of the plurality of body dimensions, a personalized three-dimensional ("3D") body model of the human body;
   comparing the personalized 3D body model with at least one of the human body represented in the 2D body image or the first silhouette to determine a difference between the personalized 3D body model and at least one of the human body represented in the 2D body image or the first silhouette;
   refining, based at least in part on the difference, the first silhouette to produce a refined silhouette; and
   processing the refined silhouette using the convolutional neural network to produce a refined plurality of body dimensions corresponding to the human body.

2. The computer-implemented method of claim 1, wherein the plurality of body dimensions include at least one of a shoulder circumference of the human body, a chest circumference of the human body, a waist circumference of the human body, a waist-to-hip ratio of the human body, a waist-to-height ratio of the human body, a shoulder-to-waist ratio, or an inseam length of the human body.

3. The computer-implemented method of claim 1, further comprising:
   receiving a second 2D body image of the human body from the 2D camera;
   processing the second 2D body image to segment a third plurality of pixels of the second 2D body image that represent the human body from a fourth plurality of pixels of the second 2D body image that do not represent the human body to produce a second silhouette of the human body; and
   wherein processing the first silhouette using the convolutional neural network to produce the plurality of body dimensions further includes:

processing the first silhouette using a first component of the convolutional neural network to produce a first set of features representative of the first silhouette;

processing the second silhouette using a second component of the convolutional neural network to produce a second set of features representative of the second silhouette;

concatenating the first set of features and the second set of features with a third component of the convolutional neural network to produce concatenated features; and processing the concatenated features with a fourth component of the convolutional neural network to produce the body dimensions.

4. The computer-implemented method of claim 3, wherein concatenating further includes:

concatenating the first set of features, the second set of features, and a third set of features generated from a third 2D body image of the human body that is different than the first 2D body image and the second 2D body image.

5. The computer-implemented method of claim 1, further comprising:

segmenting the first silhouette into a plurality of body segments.

6. The computer-implemented method of claim 1, wherein comparing further includes:

determining an approximate pose of the human body represented in the 2D body image;

adjusting the 3D body model to the approximate pose to generate an adjusted 3D body model; and comparing the adjusted 3D body model with at least one of the human body represented in the 2D body image or the first silhouette.

7. A computing system, comprising:

one or more processors;

a memory storing program instructions that when executed by the one or more processors cause the one or more processors to at least:

receive at least one two-dimensional ("2D") body image of a body, wherein:

each of the at least one 2D body image is generated by a 2D imaging element; and each of the at least one 2D body image includes a representation of the body from a different view;

process each of the at least one 2D body image to segment a first plurality of pixels of the at least one 2D body image that represent the body from a second plurality of pixels of the at least one 2D body image that do not represent the body to produce a first silhouette of the body;

process, using a neural network, each of the at least one 2D body image to determine a plurality of body dimensions, each body dimension of the plurality of body dimensions corresponding to a different body segment of the body;

generate, based at least in part on the first silhouette or at least some of the plurality of body dimensions, a personalized three-dimensional ("3D") body model of the human body;

compare the personalized 3D body model with at least one of the body represented in the at least one 2D body image or the first silhouette to determine a difference between the personalized 3D body model and the at least one of the body represented in the 2D body image or the first silhouette;

refine, based at least in part on the difference, the first silhouette to produce a refined silhouette; and process the refined silhouette using the neural network to produce a refined plurality of body dimensions corresponding to the human body.

8. The computing system of claim 7, wherein the program instructions that when executed by the one or more processors further cause the one or more processors to at least:

fit a plurality of existing body scans of a plurality of bodies to a topology, wherein each of the plurality of existing body scans include a plurality of known body dimensions;

generate, based at least in part on the plurality of existing body scans, a plurality of synthetic body scans, wherein:

each of the plurality of synthetic body scans include a corresponding plurality of known synthetic body dimensions; and the plurality of synthetic body scans is greater than the plurality of existing body scans;

generate, based at least in part on the plurality of synthetic body scans and the corresponding plurality of known synthetic body dimensions, a plurality of labeled data; and train the neural network using at least a portion of the labeled data.

9. The computing system of claim 8, wherein the topology is a Skinned Multi-Person Linear ("SMPL") topology.

10. The computing system of claim 8, wherein the program instructions that when executed by the one or more processors to generate the plurality of labeled data further include instructions that, when executed by the one or more processors, further cause the one or more processors to at least:

generate, for each of the plurality of synthetic body scans, a three-dimensional body mesh;

generate from each three-dimensional body mesh a corresponding silhouette; and generate, based at least in part on each corresponding silhouette and the known synthetic body dimensions for each of the plurality of synthetic body scans, the plurality of labeled data.

11. The computing system of claim 10, wherein the plurality of labeled data includes body features determined for each of the corresponding silhouettes and each of the known synthetic body dimensions.

12. The computing system of claim 11, wherein the body features are indicative of an input received by the neural network once trained.

13. The computing system of claim 7, wherein the program instructions that when executed by the one or more processors to cause the one or more processors to process each of the at least one or more 2D body images, further include instructions that, when executed by the one or more processors, further cause the one or more processors to at least:

process a first 2D body image of the at least one or more 2D body images to produce a first plurality of features representative of the body; and process a second 2D body image of the at least one or more 2D body images to produce a second plurality of features representative of the body.

14. The computing system of claim 13, wherein the program instructions that when executed by the one or more processors to cause the one or more processors to process each of the at least one 2D body images, further include instructions that, when executed by the one or more processors, further cause the one or more processors to at least:

concatenate the first plurality of features and the second plurality of features to produce concatenated features; and process the concatenated features to produce the plurality of body dimensions.

15. The computing system of claim 13, wherein:

the program instructions that when executed by the one or more processors to cause the one or more processors to process the first 2D body image, further include instructions that, when executed by the one or more processors, further cause the one or more processors to at least:

process the first 2D body image to produce a second silhouette of the body as represented in the first 2D body image; and produce the first plurality of features based at least in part on the second silhouette; and the program instructions that when executed by the one or more processors to cause the one or more processors to process the second 2D body image, further include instructions that, when executed by the one or more processors, further cause the one or more processors to at least:

process the second 2D body image to produce a third silhouette of the body as represented in the second 2D body image; and produce the second plurality of features based at least in part on the third silhouette.

16. The computing system of claim 15, wherein the program instructions that when executed by the one or more processors to cause the one or more processors to process each of the at least one 2D body image, further include instructions that, when executed by the one or more processors, further cause the one or more processors to at least:

concatenate the first plurality of features and the second plurality of features to produce concatenated features; and process the concatenated features to produce the plurality of body dimensions.

17. The computing system of claim 7, wherein the program instructions that when executed by the one or more processors further cause the one or more processors to at least:

process the refined silhouette to determine a refined personalized 3D body model representative of the body; and send, for presentation, the refined personalized 3D body model and at least one body dimension of the refined plurality of body dimensions.

18. A method, comprising:

processing a first two-dimensional ("2D") body image that includes a representation of a body from a first view to produce a first silhouette of the body;

determining, based at least in part on the first silhouette, a plurality of body dimensions corresponding to the body;

generating, based at least in part on the first silhouette, a three-dimensional ("3D") model of the body;

comparing the 3D body model with at least one of the body represented in the 2D body image or the first silhouette to determine a difference between the 3D body model and at least one of the body represented in the 2D body image or the first silhouette;

refining, based at least in part on the difference, the first silhouette to produce a refined silhouette;

processing the refined silhouette to produce a refined plurality of body dimensions corresponding to the human body;

generating, based at least in part on the refined silhouette, a refined 3D model of the body; and sending, for presentation, the refined 3D model of the body and at least one dimension of the refined plurality of body dimensions.

19. The method of claim 18, wherein processing the first 2D body image further includes:

determining a position of the body represented in the first 2D body image;

determining a pose of the body represented in the first 2D body image; and producing the first silhouette based at least in part on the on the position of the body and the pose of the body.

20. The method of claim 18, wherein the plurality of body dimensions include at least one of a shoulder circumference of the body, a chest circumference of the body, a waist circumference of the body, a waist-to-hip ratio of the body, a waist-to-height ratio of the human body, a shoulder-to-waist ratio, or an inseam length of the body.

21. The method of claim 18, wherein generating the 3D model further includes:

determining, based at least in part on the first silhouette, a plurality of predicted body features corresponding to the body; and generating, based at least in part on the plurality of predicted body features and a known height of the body, the 3D model.

22. The method of claim 18, further comprising:

normalizing a size of the first silhouette based at least in part on a known height of the body and an average height.

* * * * *